(12) United States Patent
Lin et al.

(10) Patent No.: US 6,675,159 B1
(45) Date of Patent: Jan. 6, 2004

(54) CONCEPT-BASED SEARCH AND RETRIEVAL SYSTEM

(76) Inventors: Albert Deirchow Lin, 17128 Patina St., San Diego, CA (US) 92127; Patrick John Graydon, 2068 Ridgeline Ave., Vista, CA (US) 92083; Justin Eliot Busch, 8530 Costa Verde Blvd., Apt. 1110, San Diego, CA (US) 92122; Maureen Caudill, 11450 Grassy Trail Dr., San Diego, CA (US) 92127; Nancy Ann Chinchor, 3145 Morning Way, La Jolla, CA (US) 92073; Jason Chun-Ming Tseng, 1284 Lake St., Millbrae, CA (US) 94030; Lei Wang, 8515 Chloe Ave., Apt. 203, La Mesa, CA (US) 91942; Bryner Sabido Pancho, 549 Almonte Pl., Chula Vista, CA (US) 91910; Kenneth Scott Klein, 5430 55th St., San Diego, CA (US) 92115; Yuri Adrian Tijerino, 17148 Patina St., San Diego, CA (US) 92127

( * ) Notice: Subject to any disclaimer, the term of this patent is extended or adjusted under 35 U.S.C. 154(b) by 290 days.

(21) Appl. No.: 09/627,295

(22) Filed: Jul. 27, 2000

(51) Int. Cl.[7] .............................................. G06F 17/30
(52) U.S. Cl. ................................ 707/3; 704/257; 704/9
(58) Field of Search ............................ 707/2, 104.1, 5, 707/103 R; 704/9

(56) References Cited

U.S. PATENT DOCUMENTS

| 4,270,182 A | 5/1981 | Asija |
| 4,864,502 A | 9/1989 | Kucera et al. |
| 4,887,212 A | 12/1989 | Zamora et al. |
| 4,914,590 A | 4/1990 | Loatman et al. |

(List continued on next page.)

OTHER PUBLICATIONS

Dunja Mladinic, Turning Yahoo into an Automatic Web Page Classifier, ECAI 98:13th European Conference on Artificial Intelligence, Brighton, UK, 8/23 to 8/28, 1998 pp. 471–472, John Wiley & Sons, Ltd.

Tom M. Mitchell, "Machine Learning", Table of Content, 1997, WCB/McGraw–Hill, New York, New York.

Choon Yang Quek, "Classification of World Wide Web Documents", Senior Honors Thesis, CMU, May 1997, pp. 1–12.

Bresnan, Joan (ed.), The Mental Representation of Grammatical Relations, Table of Contents, 1982, MIT Press, Cambridge, MA.

Charniak, Eugene, Statistical Language Learning, Table of Contents, 1993, MIT Press, Cambridge, MA.

Domingos, Pedro and Pazzani, Michael, "On the Optimality of the Simple Bayesian Classifier Under Zero–One Loss", Machine Learning 29, 1997, pp. 103–130, Kluwar Academic Pub.

Duda, Richard and Hart, Peter, Pattern Classification and Scene Analysis, 2nd Edition, Table of Contents, 1973, John Wiley & Sons, Inc., New York, NY.

(List continued on next page.)

*Primary Examiner*—Safet Metjahic
*Assistant Examiner*—Sana Al-Hashemi
(74) *Attorney, Agent, or Firm*—Banner & Witcoff, Ltd.

(57) ABSTRACT

A concept-based indexing and search system indexes collections of documents with ontology-based predicate structures through automated and/or human-assisted methods. The system extracts the concepts behind user queries to return only those documents that match those concepts. The concept based search and retrieval system comprehends the intent behind a query from a user, and returns results matching that intent. The system can perform off-line searches for unanswered user queries and notify the user when a match is found.

45 Claims, 13 Drawing Sheets

U.S. PATENT DOCUMENTS

| | | | |
|---|---|---|---|
| 4,984,178 A | | 1/1991 | Hemphill et al. |
| 5,056,021 A | * | 10/1991 | Ausborn .................... 704/9 |
| 5,101,349 A | | 3/1992 | Tokuume et al. |
| 5,146,406 A | | 9/1992 | Jensen |
| 5,237,502 A | * | 8/1993 | White et al. .................... 704/1 |
| 5,309,359 A | * | 5/1994 | Katz et al. .................. 707/102 |
| 5,331,556 A | * | 7/1994 | Black et al. .................... 704/9 |
| 5,386,556 A | | 1/1995 | Hedin et al. |
| 5,404,295 A | * | 4/1995 | Katz et al. ...................... 707/2 |
| 5,418,948 A | | 5/1995 | Turtle |
| 5,475,588 A | | 12/1995 | Schabes et al. |
| 5,687,384 A | | 11/1997 | Nagase |
| 5,694,523 A | * | 12/1997 | Wical .......................... 706/45 |
| 5,721,902 A | * | 2/1998 | Schultz .......................... 707/4 |
| 5,721,938 A | | 2/1998 | Stuckey |
| 5,761,389 A | * | 6/1998 | Maeda et al. .................. 706/11 |
| 5,790,754 A | * | 8/1998 | Mozer et al. ................ 704/232 |
| 5,794,050 A | * | 8/1998 | Dahlgren et al. ............ 717/144 |
| 5,873,056 A | | 2/1999 | Liddy et al. |
| 5,915,249 A | | 6/1999 | Spencer |
| 5,933,822 A | | 8/1999 | Braden-Harder et al. |
| 5,940,821 A | | 8/1999 | Wical |
| 5,956,708 A | * | 9/1999 | Dyko et al. ..................... 707/3 |
| 5,960,384 A | | 9/1999 | Brash |
| 5,963,940 A | * | 10/1999 | Liddy et al. .................... 707/5 |
| 5,974,455 A | | 10/1999 | Monier |
| 6,006,221 A | * | 12/1999 | Liddy et al. .................... 707/5 |
| 6,021,387 A | * | 2/2000 | Mozer et al. ................ 704/232 |
| 6,021,409 A | | 2/2000 | Burrows |
| 6,026,388 A | | 2/2000 | Liddy et al. |
| 6,038,560 A | * | 3/2000 | Wical .......................... 706/50 |
| 6,049,799 A | | 4/2000 | Mangat et al. |
| 6,055,531 A | | 4/2000 | Bennett et al. |
| 6,076,512 A | | 6/2000 | Messerly et al. |
| 6,233,575 B1 | * | 5/2001 | Agrawal et al. ................ 707/6 |
| 2002/0143755 A1 | | 10/2002 | Wynblatt et al. |

OTHER PUBLICATIONS

Gold, Mark, "Language Identification in the Limit", Information and Control 10, 1967, pp. 447–474, Academic Press.

Horning, James, A Study of Grammatical Inference, Ph.D. thesis, 1969, Stanford University, University Microfilm, inc., Ann Arbor, Michigan.

Magerman, David and Marcus, Mitchell, "Pearl: A Probabilistic Chart Parser", Proceedings of the $2^{nd}$ International Workshop for Parsing Technologies, 1991, pp. 15–20.

Magerman, David and Weir, Carl, "Efficiency, Robustness, and Accuracy in Picky Chart Parsing", Proceedings of the $30^{th}$ Annual Meeting of the Association for Computational Linguistics, 1992, pp. 40–47.

Manning, Christopher and Schutze, Hinrich, Foundations of Statistical Natural Language Processing, Table of Contents, 1999, MIT Press, Cambridge, MA.

McCallum, A., K. Nigam, S. Thrun, and T. Mitchell,. "Learning to Classify Text from Labeled and Unlabeled Documents", Proceedings of the 1998 National Conference on Artificial Intellligence, Jul. 1998.

McCallum, A., R. Rosenfeld., T. Mitchell and A. NG, "Improving Text Classification by Shrinkage in a Hierarchy of Classes," Proceedings of the 1998 International Conference on Machine Learning, 1998.

Pollard, Carl and Sag, Ivan, Head–Driven Phrase Structure Grammar, Table of Contents, University of Chicago Press, Chicago, IL.

Dirk van Eylen, "Ranking of search results using AltaVista", http://ping4.ping.be/~ping0658/avrank.html, Date unknown but prior to filing date of the present application.

Avrim Blum, Tom Mitchell, "Combining Labeled and Unlabeled Data with Co–Training", Proceedings of the 1998 conference on Computational Learning Theory, 1998.

* cited by examiner

Training_Bayes_Classifier(Example Set)

1. collect all attributes in Example Set $A \leftarrow$ all distinct attributes in Example Set
    $C \leftarrow$ all distinct values in Example set 2. calculate the value probability $P(c_j)$ and conditional probability $P(w_i|c_j)$ For each target class value $c_j$ in $C$ do $docs_j \leftarrow$ subset of Example_Set for which the target class value is $c_j$ $$P(c_j) \leftarrow \frac{|docs_j|}{|Examples|}$$

$Text_j \leftarrow$ a single document created by concatenating all attributes of $docs_j$ $N \leftarrow$ total number of attributes in $Text_j$ for each attributes in $A$ $n_k \leftarrow$ number of times attribute $w_i$ occurs in $Text_j$ $$P(w_i|c_j) \leftarrow \frac{n_k + 1}{n + |A|}$$

Classify_Text( input_text, Training_Set)

1. Access Training_Set to get and set
   $A \leftarrow$ all distinct attributes in Traing_Set
   $C \leftarrow$ all distinct values in Training_Set 2. counts how many times attributes defined in A occurs in input_text
   positions <- all word positions in input_text that contain tokens found in $A$.

3. pick one value as final answer

For each $c_j \in C$ (1) Access traing_set to get value probability $P(c_j)$ and attribute and value conditional probability $P(w_i|c_j)$ (2) calculate answer probability $P(c_j|w_1, w_2, ..., w_n)$ $$c^* = \arg\max_{c_j \in C} P(c_j|w_1, w_2, ..., w_n) = \arg\max_{c_j \in C} P(c_j) \prod_{i=1}^{n} P(w_i|c_j)$$

return $c^*$

Figure 8 Bayes Classifier Training and Classification Algorithms

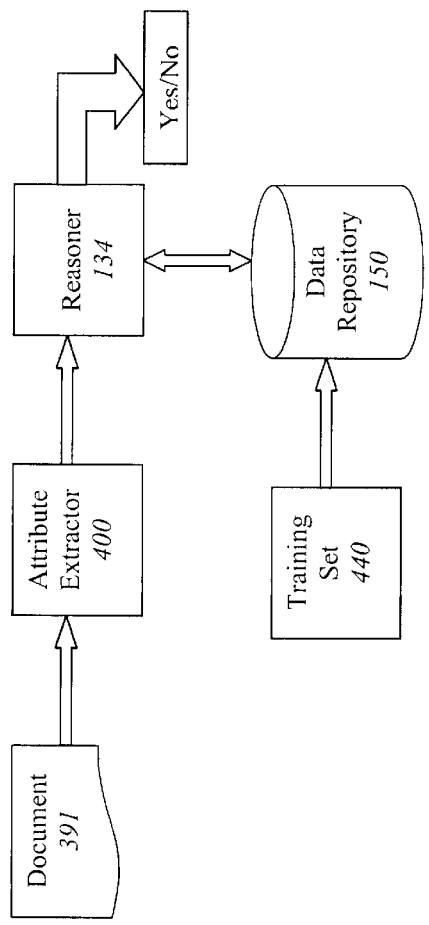
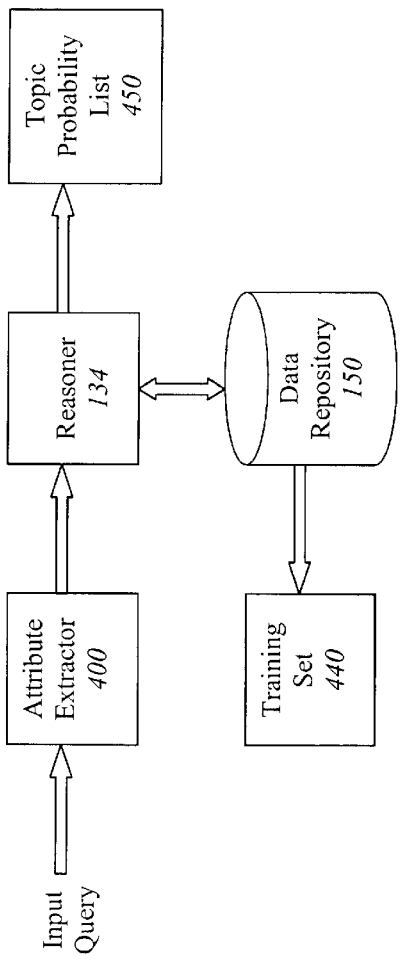

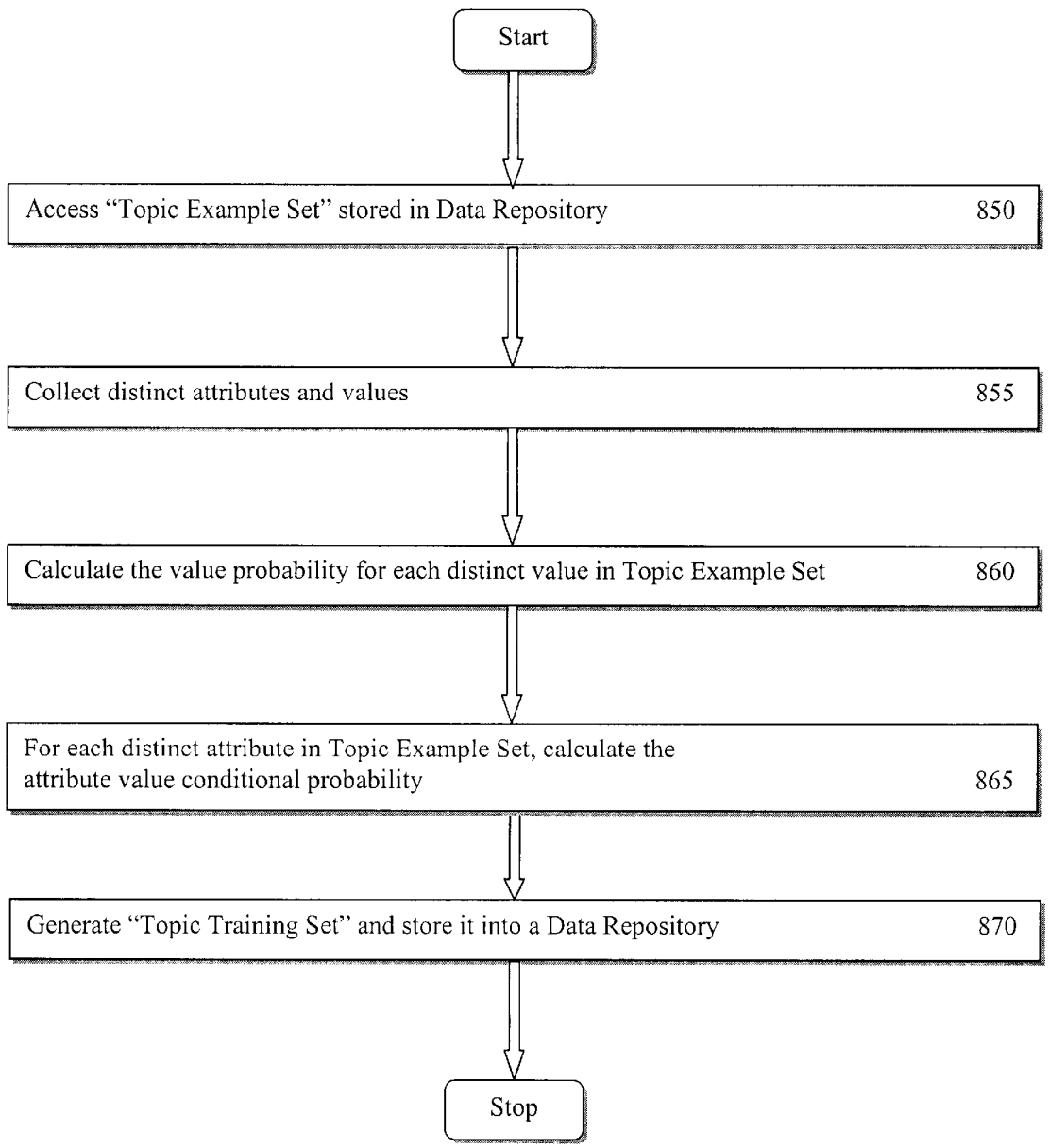

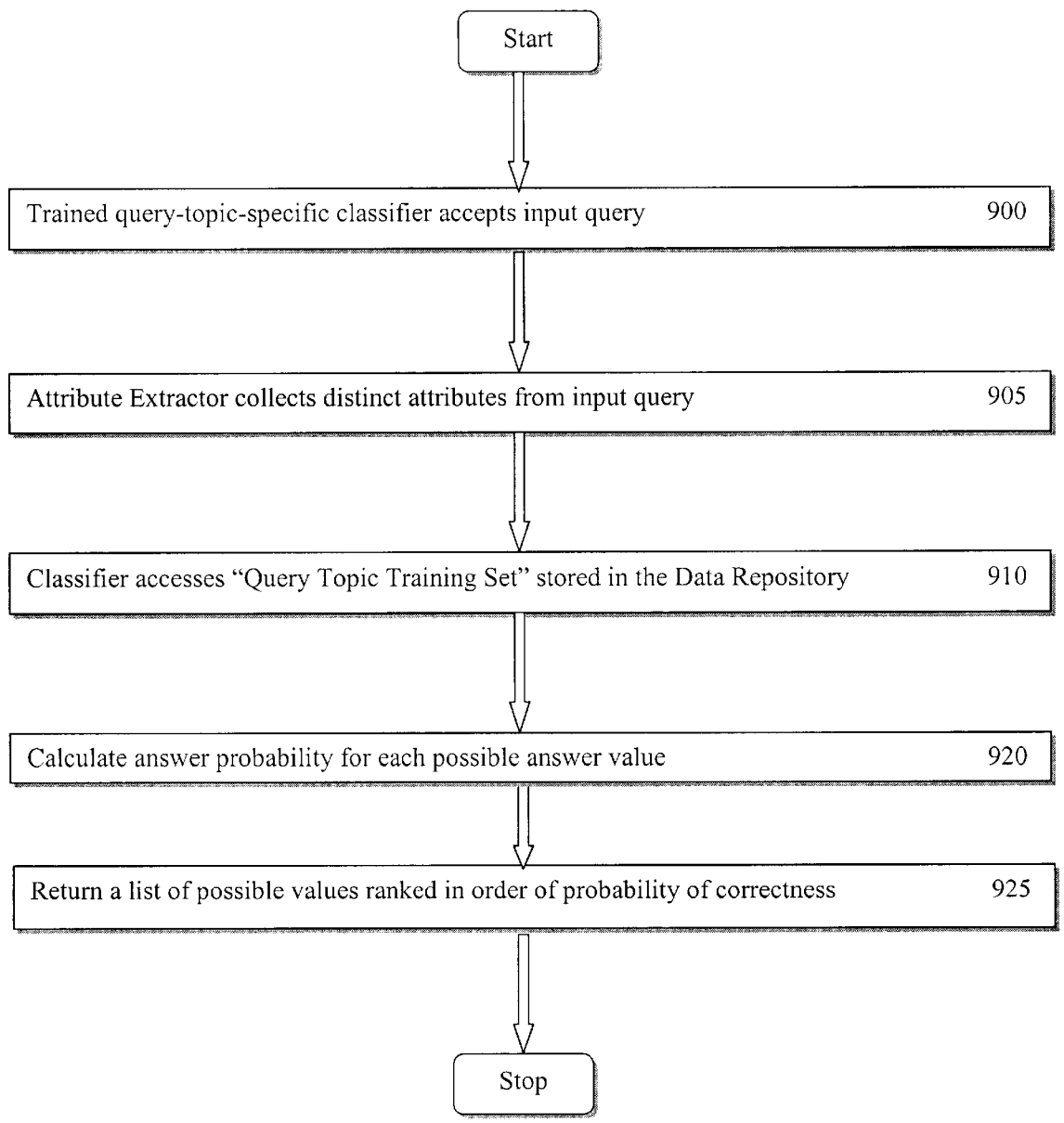

CONCEPT-BASED SEARCH AND RETRIEVAL SYSTEM

BACKGROUND OF THE INVENTION

1. Field of the Invention

The present invention relates to a concept-based search and retrieval system. More particularly, the present invention relates to a system that indexes collections of documents with ontology-based predicate structures through automated and/or human-assisted methods. The system extracts the concepts behind user queries to return only those documents that match those concepts.

2. Background of the Invention

The Internet, which was created to keep a small group of scientists informed, has now become so vast that it is no longer easy to find information. Even the simplest attempt to find information results in data overload. The Internet is a highly unorganized and unstructured repository of data, whose growth rate is ever increasing. As the data grows it becomes more and more difficult to find it.

Early pioneers in information retrieval from the Internet developed novel approaches, which can be categorized in two main areas: automated keyword indexing and manual document categorization. The large majority of current search engines use both of these approaches. For example, the earliest generation of search engines, including Lycos, Altavista, and Webcrawler, as well as the most recent ones, such as Northern Light or FAST, are all based on keyword indexing and searching. Another very popular search engine, Yahoo!, is actually a categorized repository of documents that have been manually categorized by human laborers.

Searching for information using the keyword approach requires the user to input a set of words, which can range from a single word to a natural language sentence. Normally, the input is parsed into an unstructured set of keywords. The set of keywords is then matched against an inverted index that links keywords with the documents in which they appear. Documents with the most keywords that match the input query are retrieved. Some ranking process generally follows this retrieval, and orders the returned documents by how many times the query words appear within them. The problem with this approach is that no attempt is made to identify the meaning of the query and to compare that meaning with the meaning of the documents. Therefore, there is a clear need to develop new systems that can take this into consideration.

A second approach is manual document organization. A typical document categorization search engine, Yahoo!, does not contain an inverted index, but rather a classification of documents manually categorized in a hierarchical list. When a user queries Yahoo!, a keyword-based search is run against the words used to classify documents, rather than the documents themselves. Every time the search engine capability is used, it displays the location of the documents within the hierarchy. While this approach is useful to users, so far as it means that other humans have employed common sense to filter out documents that clearly do not match, it is limited by two factors. The first factor is that it does not scale to the number of documents now available on the web, as the directory only can grow as quickly as human editors can read and classify pages. The second factor is that it does not understand the meaning of the query, and a document classified under a particular word will not be retrieved by a query that uses a synonymous word, even though the intent is the same.

As a result, there is a pressing need to develop search engines that bridge the gap between the meaning of an input query and pre-indexed documents. Existing approaches will not solve this problem, because it is impossible to determine the meaning of input queries from terms alone. A successful approach must also make use of the structure of the query. Ideally, documents and queries should both be mapped to a common logical structure that permits direct comparison by meaning, not by keywords.

Previous generations of search engines have relied on a variety of techniques for searching a database containing the full text of the documents being searched. Generally, an inverted index is created that permits documents to be accessed on the basis of the words they contain. Methods for retrieving documents and creating indexes include Monier's System for adding a new entry to a web page table upon receiving web page including a link to another web page not having a corresponding entry in a web page table, as set forth in U.S. Pat. No. 5,974,455. Various schemes have been proposed for ranking the results of such a search. For example, U.S. Pat. No. 5,915,249 to Spencer sets forth a system and method for accelerated query evaluation of very large full text databases, and U.S. Pat. No. 6,021,409, to Burrows discloses a method for parsing, indexing and searching world-wide-web pages. These patents cover techniques for creating full-text databases of content, usually world-wide-web pages, and providing functionality to retrieve documents based on desired keywords.

Full-text databases of documents are generally used to serve keyword-based search engines, where the user is presented with an interface such as a web page, and can submit query words to the search engine. The search engine contains an inverted index of documents, where each word is mapped to a list of documents that contain it. The list of documents is filtered according to some ranking algorithm before being returned to the user. Ranking algorithms provided by full-text, keyword-based search engines generally compute document scores based upon the frequency of the term within the document, where more mentions yield a higher score, as well as its position, earlier mentions leading to a higher score. The three patents discussed above are all typical representations of the prior art in text retrieval and indexing without natural language processing.

There has been substantial research in search technology directed towards the goal of imposing structure on both data and queries. Several previous systems, such as set forth in U.S. Pat. Nos. 5,309,359 and 5,404,295, deal with manual or semi-automatic annotation of data so as to impose a structure for queries to be matched to. In U.S. Pat. No. 5,309,359 to Katz, a process by which human operators select subdivisions of text to be annotated, and then tag them with questions in a natural language, is presented. These questions are then converted automatically into a structured form by means of a parser, using concept-relation-concept triples known as T-expressions. While the process of T-expression generation is automatic, the selection of text to annotate with such expressions is manual or semi-automatic. Furthermore, systems such as Katz provide only for encoding of questions, not for encoding of the documents themselves.

Another approach is set forth in Liddy et al, U.S. Pat. No. 5,963,940, which discloses a natural-language information retrieval system. The system provides for parsing of a user's query into a logical form, which may include complex nominals, proper nouns, single terms, text structure, and logical make-up of the query, including mandatory terms. The alternative representation is matched against documents in a database similar to that of the systems described previously. However, the database does not contain a traditional inverted index, linking keywords to the documents that they appear in, but rather an annotated form of the same form as the query representation. The documents are indexed by a system, which is modular and performs staged processing of documents, with each module adding a meaningful annotation to the text. On the whole, the system generates both conceptual and term-based representations of the documents and queries.

In U.S. Pat. No. 5,873,056, Liddy et al. additionally discloses a system that accounts for lexical ambiguity based on the fact that words generally have different meanings across multiple domains. The system uses codes to represent the various domains of human knowledge; such codes are taken from a lexical database, machine-readable dictionary, or other semantic networks. The system requires previous training on a corpus of text tagged with subject field codes, in order to learn the correlations between the appearance of different subject field codes. Once such training has been performed, a semantic vector can be produced for any new document that the system encounters. This vector is said to be a text level semantic representation of a document rather than a representation of every word in the document. Using the disambiguation algorithm, the semantic vectors produced by the system are said to accommodate the problem that frequently used words in natural language tend to have many senses and therefore, many subject codes.

In U.S. Pat. No. 6,006,221, Liddy et al further discloses a system that extends the above functionality to provide cross-lingual information retrieval capability. The system relies on a database of documents subject to the processing discussed above, but further extends the subject field coding by applying it to a plurality of languages. This system includes part-of-speech tagging to assist in concept disambiguation, which is an optional step in the previously discussed system. Information retrieval is performed by a plurality of statistical techniques, including term frequency, index-document-frequency scoring, Pearson moment correlation products, n-gram probability scoring, and clustering algorithms. In the Liddy et al. system, clustering provides, the needed capability to perform visualization of result sets and to graphically modify queries to provide feedback based on result set quality.

Another approach to natural-language processing for information retrieval is set forth in U.S. Pat. No. 5,794,050, to Dahlgren et al. Dahlgren et al. discloses a naïve semantic system that incorporates modules for text processing based upon parsing, formal semantics and discourse coherence, as well as relying on a naïve semantic lexicon that stores word meanings in terms of a hierarchical semantic network. Naïve semantics is used to reduce the decision spaces of the other components of the natural language understanding system of Dahlgren et al. According to Dahlgren et al, naïve semantics is used at every structure building step to avoid combinatorial explosion.

For example, the sentence "face places with arms down" has many available syntactic parses. The word "face" could be either a noun or a verb, as could the word "places". However, by determining that "with arms down" is statistically most likely to be a prepositional phrase which attaches to a verb, the possibility that both words are nouns can be eliminated. Furthermore, the noun sense of "face" is eliminated by the fact that "with arms down" includes the concepts of position and body, and one sense of the verb "face" matches that conception. In addition to the naïve semantic lexicon, a formal semantics module is incorporated, which permits sentences to be evaluated for truth conditions with respect to a model built by the coherence module. Coherence permits the resolution of causality, exemplification, goal, and enablement relationships. This is similar to the normal functionality of knowledge bases, and Dahlgren et al. claim that their knowledge is completely represented in first order logic for fast deductive methods.

Natural language retrieval is performed by Dahlgren et al.'s system using a two-stage process referred to as digestion and search. In the digestion process, textual information is input into the natural language understanding module, and the NLU module generates a cognitive model of the input text. In other words, a query in natural language is parsed into the representation format of first-order logic and the previously described naïve semantics. The cognitive model is then passed to a search engine, that uses two passes: a high recall statistical retrieval module using unspecified statistical techniques to produce a long list of candidate documents; and a relevance reasoning module which uses first-order theorem proving, and human-like reasoning to determine which documents should be presented to the user.

U.S. Pat. No. 5,933,822, to Braden-Harder et al., provides yet another natural language search capability that imposes logical structure on otherwise unformatted, unstructured text. The system parses the output from a conventional search engine. The parsing process produces a set of directed, acyclic graphs corresponding to the logical form of the sentence. The graphs are then re-parsed into logical form triples similar to the T-expressions set forth in Katz. Unlike the logical forms set forth in Katz or Dahlgren et al., the triples express pairs of words and the grammatical relation, which they share in a sentence. As an example, the sentence "the octopus has three hearts" produces logical form triples "have-Dsub-octopus", "have-Dobj-heart", and "heart-Ops-three". These triples encode the information that octopus is the subject of have, heart is the object of have, and three modifies heart.

The Braden-Harder et al system provides a mechanism for the retrieval and ranking of documents containing these logical triples. According to the patent, once the set of logical form triples have been constructed and fully stored, both for the query and for each of the retrieved documents in the output document set, a functional block compares each of the logical form triples for each of the retrieved documents to locate a match between any triple in the query and any triple in any of the documents. The various grammatical relationships discussed previously are assigned numerical weights, and documents are ranked by the occurrence of those relations between the content words. The presence of the content words is not incorporated into the ranking algorithm independently of their presence within logical triples matching the query triples. As a result, the Braden-Harder et al system replaces a keyword search based upon individual lexical items with a keyword search based upon logical triples.

U.S. Pat. No. 5,694,523 to Wical discloses a content processing system that relies on ontologies and a detailed computational grammar with approximately 210 grammatical objects. The Wical system uses a two-level ontology called a knowledge catalog, and incorporates both static and dynamic components. The static component contains multiple knowledge concepts for a particular area of knowledge, and stores all senses for each word and concept. However, it does not contain concepts that are extremely volatile. Instead, the dynamic component contains words and concepts that are inferred to be related to the content of the static component. Such an inference is accomplished through multiple statistical methods.

The Wical system is further described in U.S. Pat. No. 5,940,821. An example is given therein stating that a document about wine may include the words "vineyards", "Chardonnay", "barrel fermented", and "French oak", which are all words associated with wine. These words are then weighted according to the number of times they occur in the wine context within the body of the documents processed by the Wical system, with one distance point or weight for each one hundred linguistic, semantic, or usage associations identified during processing. As a result, the system of Wical automatically builds extensions to the core ontology by scoring words that frequently appear in the context of known concepts as probably related concepts. The scoring algorithm of Wical is fairly conservative, and should generally produce reliable results over large corpuses of data.

The Wical system produces a set of so-called theme vectors for a document via a multi-stage process that makes use of the forgoing knowledge catalog. The system includes a chaos processor that receives the input discourse, and generates the grammatical structured output. Such grammatical structured output includes identifying the various parts of speech, and ascertaining how the words, clauses, and phrases in a sentence relate to one another. Consequently, the Wical system produces not only word-level part-of-speech categorization (i.e., noun, verb, adjective, etc.), but also relations such as subject and object. The output of the chaos processor is then passed to a theme parser processor that discriminates the importance of the meaning and content of the text on the basis that all words in a text have varying degrees of importance, some carrying grammatical information, and others carrying meaning and content. After the theme parser processor has generated this information, it is considered to be theme-structured output, which may be used for three distinct purposes. One purpose is providing the topics of the discourse in a topic extractor. A second purpose is generating summarized versions of the discourse in a kernel generator. The third purpose is identifying the key content of the discourse in a content extractor. The forgoing steps are performed in parallel, and require additional processing of the theme-structured output in order to generate textual summaries, or graphical views of the concepts within a document. Such an output may be used in a knowledge-based system that identifies both documents and concepts of interest with regard to the inquiry of the user, and a research paper generation application that provides summaries of documents relevant to a query, as produced by the kernel generator set forth previously.

Ausborn, U.S. Pat. No. 5,056,021, discloses a simpler technique for creating searchable conceptual structures. The technique of Ausborn uses a database of words organized into levels of abstraction, with concepts arranged as clusters of related words. The levels of abstraction are implemented in thesauri, and are equivalent to hierarchical levels of an ontology. The system of Ausborn serves as a parser to directly compile thesaurus entries into a cluster representing cluster meaning. Clusters are then pruned by virtue of a lack of common ontological features among the words in the sentence. Sentences whose words do not have similar meaning at equal levels of abstraction are judged as erroneous parses. These structures can then be searched in a manner equivalent to the technique set forth in the Braden-Harder patent.

Some efforts have been made towards expanding queries. For example, U.S. Pat. No. 5,721,902, to Schultz, discloses a technique employing hidden Markov models to determine the part of speech of words in a sentence or sentence fragment. Once the part of speech has been selected, the word is applied to a sentence network to determine the expansion words corresponding to the query term. For a given query word, only those expansion words from the semantic network that are of the same part of speech are added to the terms in the natural language query. If a query term is a proper noun, other terms in the semantic network are not activated, even those that are also nouns, as the terms are unlikely to be similar. Schultz further discloses a relevance-scoring algorithm, which compares the query terms to the text information fields that serve as metadata within an information retrieval system. The Schultz system also discloses techniques for preparing and loading documents and multimedia into the information retrieval system. However, such techniques do not involve manipulation or reparsing of the documents and do not constitute an advance on any of the previously discussed indexing systems.

The concept-based indexing and search system of the present invention has distinct advantages over the approach set forth in the Katz and the other previously set forth patents. The Katz system tags segments of the text with formal representations of specific questions that the text represents answers to. While such an approach guarantees that a question will be answered if the question has been previously asked, the process is limited by the efficiency of the tagging system. The Katz system can provide fully automatic tagging of text. However, the implementation of a tagging system that can automatically generate appropriate questions for each segment of text requires sophisticated machine reasoning capabilities, which do not yet exist.

SUMMARY OF THE INVENTION

The forgoing and other deficiencies are addressed by the present invention, which is directed to a concept-based indexing and search system. More particularly, the present invention relates to system that indexes collections of documents with ontology-based predicate structures through automated and/or human-assisted methods. The system extracts the concepts behind user queries to return only those documents that match those concepts.

The concept-based indexing and search system of the present invention has a number of advantages over the conventional systems discussed previously. These advantages fall into two categories: improvements in the precision of information retrieval, and improvements in the user interface.

The concept-based indexing and search system of the present invention can utilize any of the previously discussed systems to collect documents and build indices. An advantage of the present invention over the conventional systems is in the area of retrieval and ranking of indexed documents.

The concept-based indexing and search system of the present invention is an improvement over the Katz system in that it transforms the text into a formal representation that matches a variety of possible questions. Whereas, the Katz system requires the questions to be known in advance, even if automatically generated, the present invention does not require prior knowledge of the questions. As a result, the present invention provides significant improvements in scalability and coverage.

The present concept-based indexing and search system also presents an advantage to the information retrieval systems of Liddy et al. The monolingual implementation of Liddy et al. constructs vector representations of document content, with vectors containing complex nominals, proper nouns, text structure, and logical make-up of the query. The logical structure provided is equivalent to first-order predicate calculus. Implementations of the system of Liddy et al. have been used to provide input to machine reasoning systems. The Liddy et al. system makes further provisions for subject codes, used to tag the domain of human knowledge that a word represents. The subject codes are used to train statistical algorithms to categorize documents based on the co-occurrence of particular words, and corresponding subject codes. The resulting system is a text level semantic representation of a document rather than a representation of each and every word in the document.

The present system imposes a logical structure on text, and a semantic representation is the form used for storage. The present system further provides logical representations for all content in documents. The advantages of the present system are the provision of a semantic representation of comparable utility with significantly reduced processing requirements, and no need to train the system to produce semantic representations of text content. While training is needed to enable document categorization in the present system, which improves the precision of retrieval, generation of the semantic representation is independent of the categorization algorithm.

The concept based search engine of the present invention also presents advantages over Dahlgren et al.'s system, embodied in U.S. Pat. No. 5,794,050. The Dahlgren system uses a semantic network similar to the ontologies employed in the system of present invention. However, it relies on a complicated grammatical system for the generation of formal structures, where complicated grammatical information is needed to eliminate possible choices in the parser. The concept based search engine system of the present invention provides an advantage in that it uses a simple grammatical system in which rule probabilities and conflicting ontological descriptions are used to resolve the possible syntactic parses of sentences. This greatly reduces the processing power required to index documents.

From the foregoing, it is an object of the present invention to provide a concept based search and retrieval system having improved functionality over conventional search and retrieval systems with equivalent efficiency in returning web pages.

Another object of the present invention is to provide a concept-based search and retrieval system that comprehends the intent behind a query from a user, and returns results matching that intent.

Still another object of the present invention is to provide a concept-based search that can perform off-line searches for unanswered user queries and notify the user when a match is found.

BRIEF DESCRIPTION OF THE DRAWINGS

These and other attributes of the present invention will be described with respect to the following drawings in which:

FIG. 8 is a diagram illustrating the Bayes training and classifier algorithms according to one variation of the present invention;

FIG. 9 is a diagram illustrating the Bayes classifier document classification process according to one variation of the present invention;

FIG. 10 is a block diagram of the Bayes classifier query classification according to one variation of the present invention;

FIG. 16 is a flow chart of query topic classification training according to one variation of the present invention; and FIG. 17 is a flow chart of a trained query topic classifier identification of an input query according to one variation of the present invention.

DETAILED DESCRIPTION OF THE INVENTION

In the following detailed discussion of the present invention, numerous terms, specific to the subject matter of a system and method for concept-based searching, are used. In order to provide complete understanding of the present invention, the meaning of these terms is set forth below as follows:

The term concept as used herein means an abstract formal representation of meaning, which corresponds to multiple generic or specific words in multiple languages. Concepts may represent the meanings of individual words or phrase, or the meanings of entire sentences. The term predicate means a concept that defines an n-ary relationship between other concepts. A predicate structure is a data type that includes a predicate and multiple additional concepts; as a grouping of concepts, it is itself a concept. An ontology is a hierarchically organized complex data structure that provides a context for the lexical meaning of concepts. An ontology may contain both individual concepts and predicate structures.

The present system and method for concept-based searching is distinguishable from an ontology-based search system. A purely ontology-based search system would expand queries from particular words to include synonyms, instances, and parent concepts (e.g. submarine is a synonym with U-boat, IBM is an instance of a company, and vehicle is a parent concept of automobile). However, such an ontology-based search system would only search for documents containing other words that are defined by the ontology to be related to the query. On the other hand, a method and system for concept-based searching according to the present invention has the capabilities of an ontology-based search system plus it can search for logically structured groupings of items from the ontology.

Figure 1:
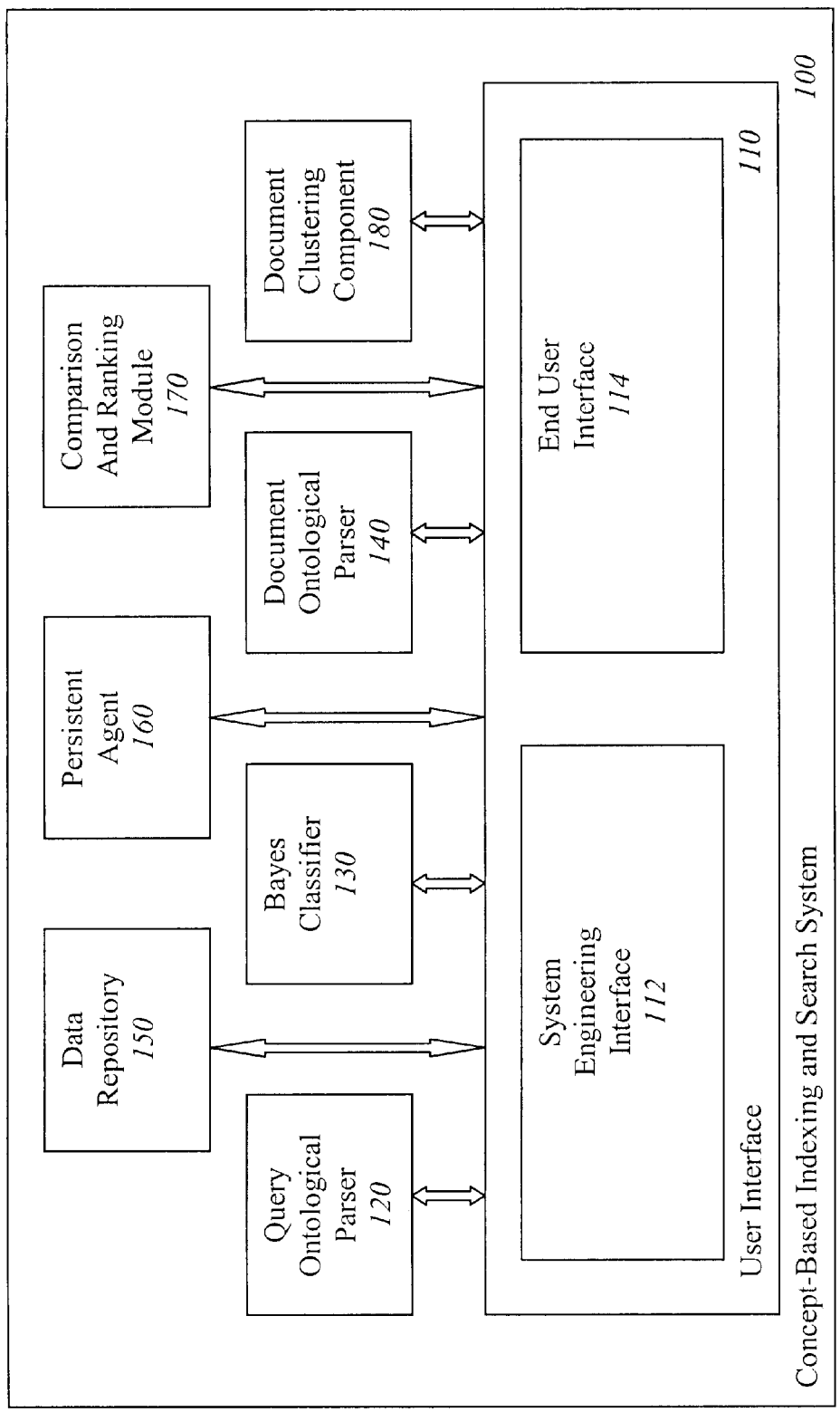
FIG. 1 is a block diagram of the concept based search and retrieval system according to the present invention.

Referring to FIG. 1, the concept-based indexing and search system 100 of the present invention includes a user interface 110, a query ontological parser 120, a Bayes classifier 130, a document ontological parser 140, a data repository 150, a persistent agent 160, a comparison and ranking module 170, and a document clustering component 180.

The user interface 110 provides a means for both system engineers and end users to interact with the system. The system engineering interface 112 of the user interface 110 allows engineers the ability to maintain, monitor and control system operations. There are two methods of monitoring of the system. The first method uses a graphical user interface (GUI) that displays current tasks in progress, user logs, and other types of statistical information. The second method of monitoring the system is through event-driven notification. The system alerts an engineer of particular events or irregularities in system operation that may require immediate attention. The engineers receive notification of these events via short messaging service to PCS wireless phones or e-mail to their desktops. To fine tune and control the system, the graphical user interface will provide engineers methods for managing internal processes and system properties. To train the system further, engineers will be able to input queries using the same graphical user interface.

The end user interface 114 provides a clear and simple graphical user interface that allows users to submit queries to the system. The end user interface 114 is responsible for creating a secure connection to the system for query. Once connected, the end user interface 114 will register with the system to receive results for the user query. Once the query is processed, the end user interface 114 will format and present the results to the user in a logical manner.

In order to support different types of users to the system, the user interface 110 can be implemented in whatever fashion is most desirable for the user. For example, web browser users can submit queries to the system via an HTML web site utilizing the Hyper Text Transfer Protocol (HTTP). Application-level connections may use the concept based search engine through standards such as CORBA or Java RMI. In order to provide such flexibility, the system will rely on plug and play communication components that will translate information between the client and server modules. These communication components allow for quick integration between completely separate systems.

The query ontological parser 120 is a component of the system, which transforms user queries entered in natural language into predicates, the formal representation system used within the concept based search and retrieval system of the present invention. While the query ontological parser 120 is optimized for parsing user queries, it is identical to the document parser 140 discussed in detail below.

Figure 2:
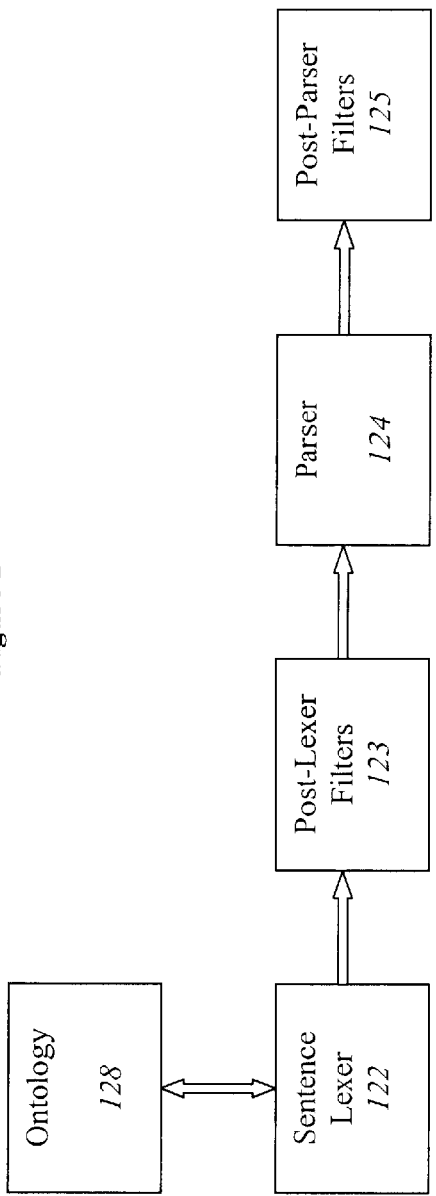
FIG. 2 is a block diagram of the query ontological parser according to the present invention.

As shown in FIG. 2, the query ontological parser 120 has five components, namely a sentence lexer 122, post-lexer filters 123, a parser 124, post-parser filters 125, and an ontology 128. The sentence lexer 122 transforms input sentences into part-of-speech-tagged instances of concepts from the ontology 128. Any ontology 128 may be used, as may any part-of-speech tagging algorithm. Multiple sequences of ontological concepts may be produced by the sentence lexer 122. Consequently, post-lexer 122 filters 123 are employed to prune out some of the sequences based on rules about sequences of syntactic tags.

The parser 124 creates syntactic tree structures that represent the grammatical relations between the ontological concepts, based on the syntactic tags attached to the concepts. The tree structures are created through the use of a context-free grammar, and may be implemented through a variety of techniques. Post-parser filters 125 are used to eliminate parse trees based on rules about improbable syntactic structures, and rules about conflicting ontological specifications.

The ontology 128 is a lexical resource that provides information about words, including both their possible syntactic uses and their meaning. WordNet™ is used in the example embodiment discussed below; however, any ontology 128 may be used.

The sole function of the query ontological parser 120 is to use the five components to create predicate structures, which are then used as keys to search the data repository for documents which match the query of the user.

The Bayes classifier 130, shown in FIG. 1, is a tool for probabilistically classifying documents and queries by the users. The Bayes classifier 130 is an implementation of the known naïve Bayes classifier approach for classifying text, from which the system can build query-topic-specific and document-domain-specific classifiers. A document-domain-specific Bayes classifier uses the words that make up a particular concept as features to determine if a particular document belongs to a specific domain. A query-topic-specific Bayes classifier uses the words that make up a particular question as the features it uses to identify the topic of the question. The primary reason for using a Bayes classifier 130 is because it is a rapid, effective technique for reducing the number of documents to be searched in response to a query. The indexing, parsing and searching time of the system is thereby dramatically reduced.

Figure 3:
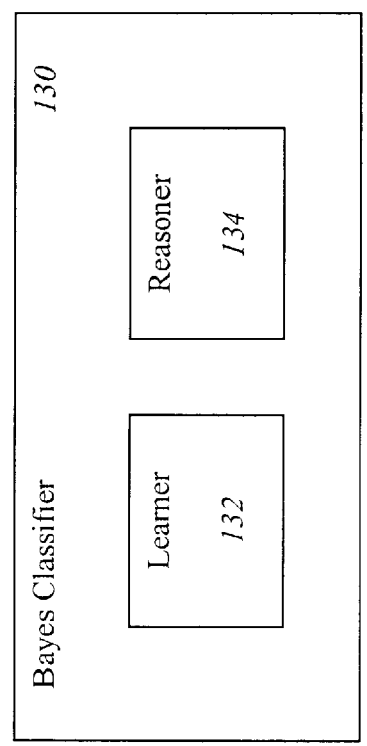
FIG. 3 is a block diagram of a Bayes classifier according to one variation of the present invention.

Referring to FIG. 3, the Bayes classifier 130 has two main components, a learner 132 and a reasoner 134. The learner 132 is responsible for training the classifier. Before the classifier 130 is trained, it is totally naïve and cannot properly classify text. During the training process, the learner 132 obtains knowledge from a set of example data called the example set, and generates a set of trained document examples called the training set.

The reasoner 134 is the question-answering component of the Bayes classifier 130. The reasoner 134 is responsible for determining the probability that each pre-classified document is the correct answer to a given question. The reasoner 134 makes a decision based on the knowledge acquired during the learning process.

In general, the Bayes classifier 130 will perform a learning process and an answering process 134. The learning tree process uses a set of hand-classified documents to train the classifier 130 from an original naïve state to one in which it can correctly classify new documents. The reasoner 134 answering process has two types of output, based on the input to the classifier 130. First, the trained classifier 130 accepts a new document as input and calculates the probability that the input document belongs to the specific domain it is trained to classify. In the second mode, the trained classifier 130 accepts a query and calculates the probability that the query belongs to the topic the classifier 130 is trained on. The resulting probabilities in either case determine the response from the reasoner 134.

Returning to FIG. 1, the document ontological parser 140 is used by the concept-based search and retrieval system to transform documents into predicate structures for storage in the data repository. The document ontological parser 140 is one of two versions of ontological parser 140 used by the concept based-search and retrieval system 100. The document ontological parser 140 is optimized for the grammatical structure of documents meant to be indexed, but is otherwise identical to the query ontological parser 120.

The document ontological parser 140 contains the same components as the query ontological parser 120; however, the grammar for the document ontological parser 140 is written for declarative sentences, which are the type usually found in documents. The document ontological parser 140 receives documents and passes predicate libraries to the data repository 150. The document ontological parser 140 is only used in the indexing process, while the query ontological parser 120 is only used during retrieval.

The data repository 150 manages data persistence and provides methods for data storage and retrieval. The data repository 150 hides the storage implementation details to the rest of the system by providing a general set of methods and interfaces for data access. The object-oriented design of the data repository 150 allows for different types of underlying storage systems to be utilized. Possible storage implementations may consist of a relational or object oriented database. Databases are generally used to store massive quantities of data generated by search engine indexes. By abstracting the underlying storage interface, a variety of solutions can be implemented without modification of other components.

The function of the data repository 150 is to provide uncomplicated access of complex data structures, through encapsulation of the current method of data storage being implemented. The data repository 150 stores three different types of data: result data, Bayes data and ontology data. With regards to system initialization, the data repository 150 provides access to stored data for the Bayes classifier 130 and ontological parser 140. In order for the Bayes classifier 130 to filter documents, it must retrieve training set data stored in the data repository 150. When domain specific classifiers are retrained, the new training set data is stored in the data repository 150 in two ways: for retrieving ontology data, and for storing and retrieving predicate library structures. As training queries are processed, the query predicate libraries generated by the query ontological parser 120 and matching document predicate libraries from the document ontological parser 140 are stored together within the data repository 150 for later user query.

The concept-based search and retrieval system will sometimes fail to answer a query from predicate-based data repositories 150. The data repository 150 might not have enough indexed documents at the time of the search. A persistent agent-based approach takes advantage of unanswered queries to index new documents capable of answering later queries about the same subject or to notify the user of the original query when such document is found.

For example, a query may be: "Does Botswana possess biological weapons?" If the comparison and sorting algorithm does not find any documents with predicate structures indicating that Botswana has biological weapons in the data repository 150, the answer returned may be: no documents found. However, the comparison and sorting algorithm may determine that some documents containing related information exist. The algorithm may produce documents about another country from the same region having biological weapons, or information about Botswana having other types of weapons.

When the query answer is "no documents found," the system can assume that it failed to answer the question. Furthermore, when the system returns any document, the user has the opportunity to provide input as to the accuracy of the match between the documents provided and the intention behind the query of the user. Thus, even if the system provides some matching documents, the user might decide that the system 100 failed to answer the question appropriately by clicking on a button or checking a box in the interface 114. Based on such feedback, the persistent agent can attempt to find documents that could answer similar queries in the future by creating persistent agents that attempt to find ontological predicate structures that match the query.

The persistent agent maintains a collection of predicate structures extracted from the query. All new documents in the data repository 150 are searched, or all newly located documents parsed by the document ontological parser 140 are monitored. Once a document is found that closely matches the query, a notification is sent to the user. In addition, the document is indexed accordingly and placed in the data repository.

The concept based search and retrieval system 100 may also fail to produce a valid response if the query is formulated in terms not previously included in the ontology. In such an instance, the persistent agent notifies a knowledge engineer that a query, sent by a user might contain a new concept, and waits for confirmation by the engineer that the query is a new concept, and the new concept is added to the ontology. The persistent agent then monitors the new documents as they are indexed by the document ontological parser 140.

The next component of the system is the comparison and ranking module 170. The basic premise of relevancy searching is that results are sorted, or ranked according to certain criteria. The system provides a comparison and ranking algorithm, described below, to determine the similarity between a query from a user and a document, and rank each document based upon a set of criteria. Since the concept based search and retrieval system 100 will break down each natural language text into a set of predicates, the documents are represented as a predicate library. A user query is converted to one or more predicates. The ranking and comparison algorithm is designed to rank the similarity between two predicate structures.

In order to determine precisely the information converted by the predicate, the algorithm implements a modifier strategy to adjust the weight for each factor that modifies the information converted to the system. The concept based search and retrieval system 100 defines 13 different types of modifiers with which to adjust the weight of each factor, as shown in Table 1 below.

TABLE 1

| Modifier Name | Explanation of Modifier |
| --- | --- |
| VerbOnlyMatchModifier | Weight for matching two predicates structure's verb parts |
| NounCountModifier | Weight for matching two predicates structure's argument parts |
| VerbNounMatchModifier | weight for matching complete predicate structures. |
| PredicateStructure ExactMatchModifier | weight for two exactly matched predicate structures |
| PredicateExact MatchModifier | weight for two exactly matched predicates |
| ConceptExact MatchModifier | weight for two exactly matched concepts |
| ConceptProximityModifier | Weight consider the ontological relationship between two concepts |
| SameStemModifier | Weight for two words are from same stem |
| ArgumentMatchModifier | Weight for two argument are exactly match |

TABLE 1-continued

| Modifier Name | Explanation of Modifier |
| --- | --- |
| ProperNounExactMatchModifier | weight for two exactly matched proper nouns |
| SymbolMatchModifier | weight for two matched symbols |
| FrontLineModifier | weight for a predicate in which the corresponding sentence occurs within the first 10 sentences of the document |
| DocSizeModifier | weight for adjust document size |

The document clustering component 180 provides one final level of filtering accumulated documents against the user's query. This ensures that users receive the optimal set of matching documents with minimal extraneous or irrelevant documents included.

On occasion, the best-fit set of document matches for a particular query will contain an excessively large number of documents. This can happen, for example, when the user's query is too general to enable the system to eliminate enough documents. Under these circumstances, the document clustering component 180 provides an intelligent, adaptive filter to focus user attention on those documents most likely to meet user needs and interests.

The document clustering component 180 uses adaptive self-organizing feature map technology to appropriately and dynamically cluster the documents returned by the system as matches for the concepts in the user's query. The document clustering component 180 processes the set of documents proposed as matches based, not on individual concepts listed within those documents, but rather on the basis of patterns of concepts throughout the document. These complex concept patterns are used as the inputs to a self-adaptive feature map, which then automatically creates a cluster model that represents the statistical probability distribution of the documents in the proposed matching set. A sample document from the matching set is shown to the user, who can specify that the example is either "similar to the desired documents" or "not very similar to the desired documents."

If the user declares that the example is similar to the documents desired, the document clustering component 180 immediately returns those other documents within the overall set that most closely cluster around the example document. If the user declares that the example is not similar to the documents desired, the document clustering component 180 presents another example, this one chosen from a document cluster far from the first example's cluster. The user may again decide if this new sample is "similar to" or "not similar to" the desired documents.

In essence, the user, within a very few examples, often as few as one or two, partitions the space of matching documents into more refined categories. This partitioning is based on the global pattern of concepts across the entire document, as opposed to the individual concepts used in the other stages of processing within the system. This is, in effect, a higher-level meta-search through concept-pattern space, providing greater discrimination and more refined selection capabilities.

In addition to this mode, the document clustering component 180 also pre-clusters those documents stored in the data repository, so that they can be more easily and efficiently processed to generate and refine query matches.

Ontological parsing is a grammatical analysis technique built on the proposition that the most useful information, which can be extracted from a sentence, is the set of concepts within it, as well as their formal relations to each other. It derives its power from the use of ontologies to situate words within the context of their meaning, and from the fact that it does not need to find the correct purely syntactic analysis of the structure of a sentence in order to produce the correct analysis of the sentence's meaning.

The ontological parser is a tool, which transforms natural-language sentences into predicate structures. Predicate structures are representations of logical relationships between the words in a sentence. Every predicate structure contains a predicate, which is either a verb or a preposition, and a set of arguments, which may be any part of speech. Predicates are words which not only have intrinsic meaning of their own, but which also provide logical relations between other concepts in a sentence. Those other concepts are the arguments of the predicate, and are generally nouns, because predicate relationships are usually between entities.

The ontological parser 120 contains two significant functional components, namely, a sentence lexer 122, a tool for transforming text strings into ontological entities and a parser 124, a tool for analyzing syntactic relationships between entities.

Figure 4:
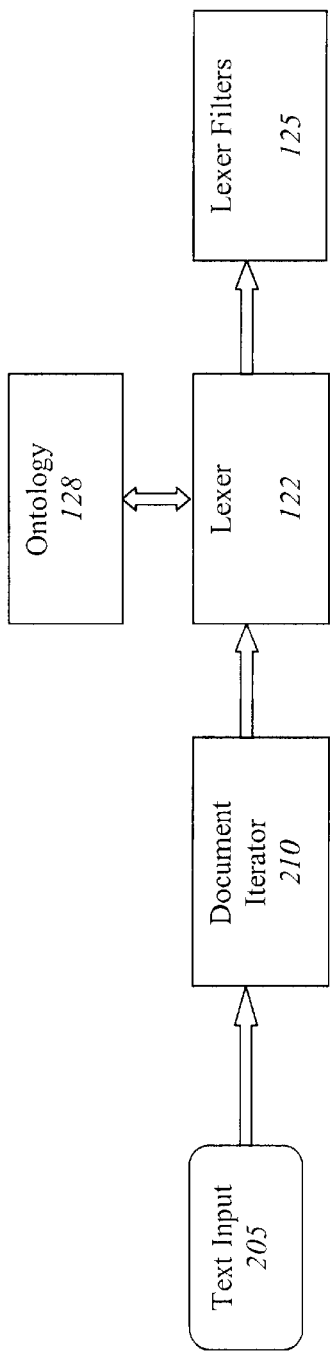
FIG. 4 is a block diagram of the sentence lexer according to one variation of the present invention.

The architecture of the sentence lexer 122 is shown in FIG. 4. A Document iterator 210 receives documents or text input 205, and outputs individual sentences to the lexer 122. As the lexer 122 receives each sentence, it passes each individual word to the ontology 128. If the word exists within the ontology 128, it is returned as an ontological entity; if not, it is returned as a word tagged with default assumptions about its ontological status. In one embodiment, words are automatically assumed to be nouns; however, the words may be other parts of speech.

After the lexer 122 has checked the last word in a sentence against the contents of the ontology 128, the sentence is passed to a series of lexer filters 125. Filters 125 are modular plug-ins, which modify sentences based on knowledge about lexer word meanings. The preferred embodiment contains several filters 125, although more may be developed, and existing filters may be removed from future versions, without altering the scope of the invention. The document ontological parser 140 employs the following filters: proper noun filter, adjective filter, adverb filter, modal verb filter, and stop word filter. The query ontological parser 120 makes use of all these filters, but adds a pseudo-concept filter.

The stop word filter removes stop words from sentences. Stop words are words that serve only as placeholders in English-language sentences. The stop word filter will contain a set of words accepted as stop words; any lexeme whose text is in that set is considered to be a stop word.

An adjective filter serves to remove lexemes representing adjective concepts from sentences. Adjective filter checks each adjective for a noun following the adjective. The noun must follow either immediately after the adjective, or have only adjective and conjunction words appearing between the noun and the adjective. If no such noun is found, the adjective filter will veto the sentence. The noun must also meet the selectional restrictions required by the adjective; if not, the adjective filter will veto the sentence. If a noun is found and it satisfies the restrictions of the adjective, the adjective filter will apply the selectional features of the adjective to the noun by adding all of the adjective's selectional features to the noun's set of selectional features.

The proper noun filter groups proper nouns in a sentence into single lexical nouns, rather than allowing them to pass as multiple-word sequences, which may be unparsable. A proper noun is any capitalized Lexeme representing a noun concept. If a word appears at the beginning of a sentence, it is considered capitalized (and therefore a proper noun) if and only if it was not present in the lexicon. Although a number of proper nouns are already present in the lexicon, they are already properly treated as regular lexical items. Since proper nouns behave syntactically as regular nouns, there is no need to distinguish proper nouns and nouns already in the lexicon. The purpose of the proper noun filter is to ensure that sequences not already in the lexicon are treated as single words where appropriate.

The modal verb filter removes modal verbs from sentence objects. Modal verbs are verbs such as "should", "could", and "would". Such verbs alter the conditions under which a sentence is true, but do not affect the meaning of the sentence. Since truth conditions do not need to be addressed by the ontological parser 120 or 140, such words can be eliminated to reduce parsing complexity. The modal verb filter will contain a set of modal verbs similar to the stop word list contained in stop word filter. Any Lexeme whose text is in that set and whose concept is a verb is identified as a modal verb, and will be removed.

The adverb filter removes Lexemes containing adverb concepts from sentences. Adverbs detail the meaning of the verbs they accompany, but do not change them. Since the meaning of the sentence remains the same, adverbs can be removed to simplify parsing.

The pseudo-concept filter operates only in the query ontological parser 120. It removes verbs from queries, which are not likely to be the actual predicate of the query. Pseudo-predicate verbs include "give", "show", and "find". Not all instances of these verbs are pseudo-predicates; however, the first instance of them in a query often is. The initial deterministic rule to be used in implementing pseudo-concept filter is that it should remove any instance of these verbs not preceded by a content-bearing noun (i.e., one not appearing in the list of pseudo-concepts or stop words).

The pseudo-concept filter operates only in the query ontological parser 120. It removes concepts from queries, which are not likely to be the actual concept the user intends. Pseudo-concepts are largely nouns, and can be captured by a stop word list. Pseudo-concepts include "I", "me", "you", and in certain syntactic usages, "information", "news", and related words. Two rules are included in the pseudo-concept filter implementation. The first rule is that any word relating to the user, or his current situation, such as "I" or "me" is always deleted. The second rule is that any of the "information"-type words is deleted when followed by a preposition.

Figure 5:
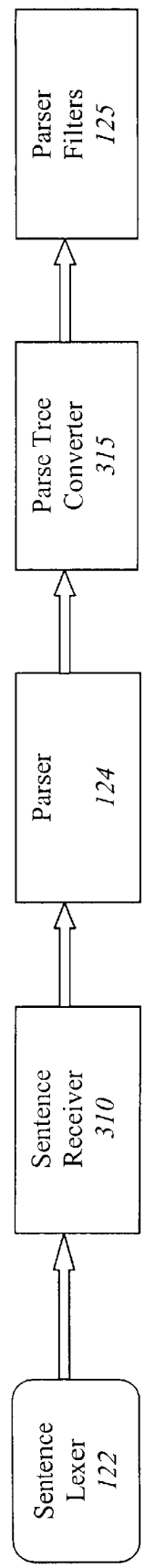
FIG. 5 is a block diagram of the parser according to one variation of the present invention.

The architecture of the parser 124 is shown in FIG. 5. First, the sentence receiver 310 obtains sentences consisting of ontological entities produced by the sentence lexer 122. These sentences are parsed by the parser 124, which is designed to use a context-free grammar, although other grammatical models may be used without departing from the scope and spirit of the invention. Sentences are parsed into structures called parse trees, which represent the relationships between concepts in a sentence. Parse tree converter 315 receives the output of the parser 124, and converts the parse trees into predicates. Following the Parse tree converter, Parser filters 125 operate on the predicates to remove erroneously generated predicates based on rules about the probability of syntactic analyses, as well as rules about the compatibility of concepts with each other.

The Naïve Bayes is an established text classification algorithm based on Bayesian machine learning technique. The algorithm is based on a simple theorem of probability known as Bayes' theorem or Bayes' formula. Mathematically, the formula is represented as $$P(c_j | D) = \frac{P(D | c_j)P(c_j)}{P(D)}$$

where $c_j$ is a possible class in the set of all possible classes C, D is the document to be classified, P ($c_j$ D) is the probability that document D belongs to class $c_j$.

This method has the underlying assumption that the probability of a word occurring in a document given the document class $c_j$ is independent of the probability of all other words occurring in that document given the same document class:

$$P(w_1, ..., W_n | c_j) = \prod_i P(w_i | c_j)$$

where $(w_1, ..., w_n)$=D. Thus, this classifier picks the best hypothesis c* given by:

$$c^* = \underset{c_j \in C}{\operatorname{argmax}} P(c_j | w_1, w_2, ..., w_n) = \underset{c_j \in C}{\operatorname{argmax}} P(c_j) \prod_{i=1}^{n} P(w_i | c_j)$$

The Bayes classifier 130 is a tool for answering question of rigid form based on a collection of example answers. It is capable of learning from a set of example questions and their answers. These examples are referred to as the Example Set. After learning from them, the classifier is said to be trained. A trained classifier is capable of answering questions whose form is similar to the forms of the questions in the example set. The answers that a classifier can give or learn from are called values. A Bayes classifier 130 can only answer a question with a value that was present in the Example Set. Questions consist of a set of attributes, each of which is a word, token, or term. A classifier can only consider attributes that were present in its Example Set when answering a question.

The construction and use of a Bayes classifier 130 in the system can be decomposed into three functional stages:

| | |
|---|---|
| Example Collection Stage: | collect all example data from a set of example documents. |
| Classifier Training Stage: | Learner trains classifier using given example data. |
| Classifier Reasoning Stage: | Reasoner 134 answers question based on its trained knowledge |

Figure 6:
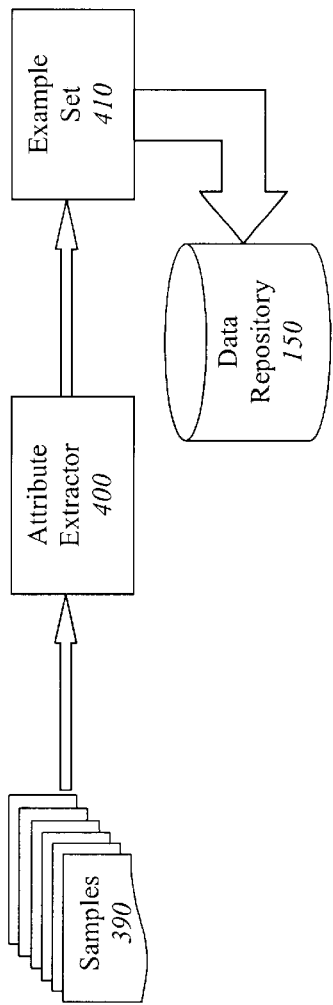
FIG. 6 is a block diagram of the Bayes classifier collection stage according to one variation of the present invention.

FIG. 6 illustrates the Bayes classifier 130 example collection stage for a domain-specific classifier. The system provides a collection of example documents, which contains both documents relevant to the specific domain and documents irrelevant to the specific domain. Topic editors manually classify each example document and assign a value "YES" or "NO" to it to indicate the document is a positive or negative example document. After Topic editors' classification, as shown in FIG. 6, the attribute extractor 400 will collect all attributes from input example documents 390. An example set 410 is then generated based on the attributes and value of each Example documents. Example set 410 will be stored in data repository for later uses.

Attribute extractor 400 includes processes to eliminate the stop words in the input documents and eliminate words case sensitivity problem. In general, all words in a document are converted to lower case before performing attribute collection. Stop words are those words that are judged to be so common in an information system that they have little information value. Such as "a", "the", "of" and "is", "could", "would". The elimination of stop words will reduce the example set 410 size and save data repository space.

For a query-topic-specific classifier the system will pre-define a set of topics that the query will fill in, such as "art", "business", "finance", "health", "science". For each topic, topic editors input a set of sample queries. The attribute extractor 400 will collect all attributes from the sample queries, and generate Example set 410. The value assign to each query example is the topic's name.

Besides including a filter stop words process, attribute extractor 410, for the query-topic-specific classifier, includes a process to expand the attributes based on its meaning in the sample queries. For example for a query like "What is the current situation of the stock market?" Attribute extractor 400 extracts direct attributes "current", "situation", "stock", and "market" from this query. It also can expand attribute "stock" to "finance", "banks", "brokerages" "Wall Street," etc. by implementing a concept ontology that contains hierarchical concepts. This process will improve the speed of generating an example set 410 and save topic editors' editing time.

Figure 7:
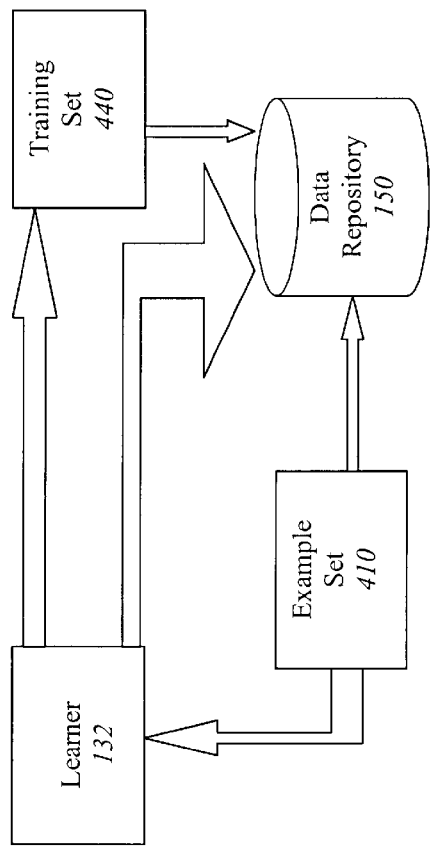
FIG. 7 is a block diagram of the Bayes classifier training stage according to one variation of the present invention.

A classifier training stage using the collected example data to train the classifier is shown in FIG. 7. The algorithm for training the Bayes Classifier is shown in FIG. 8.

The learner component 132 sends a request to data repository 150 to get an example set 410 generated. Then the learner 132 uses the data stored in example set 410 to train the classifier 130. Actually the training process of Bayes classifier 130 is the process to calculate the class value probability $P(c_j)$ and conditional attribute probability $P(w_i c_j)$ the training process will populate the training set 440 with attribute, class value and calculated probability values. A populated training set 440 represents the knowledge of a Bayes classifier 130.

In a classifier reasoning stage, a trained Bayes classifier 130 performs question-answering functions based on the knowledge learned from classifier training process.

In general, the system will accept an input text. Attribute extractor 400 collects all attributes in this input document and sends them to the reasoner 134. After the reasoner 134 accepts the input attributes, it sends a request to the data repository 150 to access correspond a training set 440. According to the Bayes' formula, the reasoner 134 will calculate the answer probability $P(c_j w_i, w_2, w_n)$ for each possible class value $c_j$ and pick the class value $c_j$ with the maxim answer probability as the final answer.

The algorithm for calculating answer probability $P(c_j w_i, w_2, w_n)$ is described as follows and is shown in FIG. 8.

Two different kinds of Bayes classifiers are defined in this system. One is document domain specific classifier, which is used to determine if an input document 391 belongs to a specific domain or not. FIG. 9 shows how a document domain specific classifier reasons. The system will accept the input document, then attribute extractor 400 collects all attributes occurring in the input document and sends them to document-domain-specific classifier's reasoner 134. The reasoner 134 performs classification based on the knowledge it learned and give back answer "Yes" or "No" to indicate the input document belongs to or not belongs to the specific domain.

The other kind of Bayes classifier 120 is the query topic specific classifier, which is used to identify input query's topic. FIG. 10 describes how a query-topic-specific classifier determines input query's topic. The input query is sent to attribute extractor 400, which collects all attributes in the query. Reasoner 134 performs classification of query's topic based on the knowledge stored at the training set 440, inputs an attributes collection, and generates a list 450 of candidate topics ranked in order of probability of correctness. The system can decide to choose only the first one or a few of topics as input query's topic(s).

Self-organizing feature maps are well-understood and computationally tractable systems for providing statistical and probabilistic modeling of large, complex sets of data with minimal computational overhead. In contrast to other probability distribution mapping techniques, the self-organizing feature map processes only a single input pattern at a time, with no need to retain large data sets in memory for global processing across the entire collection of data.

In the document clustering component 180 the input pattern, in this case a pattern of ontological concepts generated by the ontological parsers 120 and 140, is formulated in the form of a vector. This vector is fed into a simple, two-layer self-organizing feature map, with small, randomly assigned adaptive weights allocated to each node in the feature map, and to each input connection from the input vectors to each node. For each such node in the map, the dot product (a measure of relative closeness) is calculated between the input vector V and the weight vector W of the weights on the input connections for that node. The node with the largest dot product is the node with a weight vector that most closely aligns in concept pattern space with the input vector. This node, plus those nodes in its immediate physical vicinity within the feature map, adjusts their weight vectors W via a simple learning algorithm:

$$W_{new}=W_{old}+k(V-W_{old})$$

In this algorithm, k is the learning parameter, which varies slowly throughout the training process. Because this training process is computationally extremely simple, it can be performed in real-time environments with little operational time penalty. In addition, the size of the vicinity of the feature map being adjusted with each input pattern is similarly adjusted, typically reduced, until only a single node's weight vector is adjusted with each new pattern.

The effect of this is that after a substantial number of input patterns are processed (or after a smaller number of input patterns are repeatedly processed), the distribution of the weight vectors in concept pattern space is an accurate model of the probability distribution function of the input patterns of the vectors used during this training. Because the training processing is so simple, it's also practical to leave training on constantly, thus allowing the feature map to continually adapt to changing distributions of patterns.

The document clustering component 180 makes use of the results of the document ontological parser 140. Each document stored in the Data repository 150, and each document matched to a user query, must first be processed by the ontological parser 140 to determine that it is such a match. As a result, a collection of predicates is associated with that document. The pattern those predicates make within a document constitutes the concept pattern of that document.

The concept pattern of a document is more revealing than any single predicate within the document when trying to determine the contents of a document. Thus, the document clustering component 180 can be used to provide a more in-depth, query-specific search when the basic ontological parsing cannot winnow the search space sufficiently.

As the concept based search and retrieval system 100 begins to produce potential matches for a specific user query, the document clustering component 180 begins to train itself on those matches. Each document is represented by one or more concept pattern vectors, and, as a document is added to the list of possible matches, those concept pattern vectors are fed to a self-adaptive feature map constructed specifically for this query. The nascent feature map self-adapts to these concept pattern vectors as they appear, so that by the time the final document match is located, the feature map is mostly, or even fully, trained. At this stage, the feature map represents clusters of documents, which are relatively more or less similar to each other.

When it is determined that the set of located matches exceeds a user-specified too many matches parameter, the document clustering component 180 selects one example document from one of the larger clusters of documents within the feature map. (This represents the most common cluster of concept patterns, and therefore represents a reasonable guess at the documents most likely to match the user's original query.) This document is presented to the user along with a choice of "more documents like this" or "documents different than this."

If the user requests similar documents, the document clustering component 180 presents those documents clustered closest to the example document within the feature map, up to the user-specified maximum number. These documents will be the closest available matches to the user's query within the searched space.

If the user requests more documents different than the example, the document clustering component 180 presents a new example or examples from a cluster or clusters as far from the original cluster as possible. This, in essence, bisects the multidimensional concept pattern space. The user can again determine if the new example is similar to or different than the desired documents, and the partitioning of concept pattern space continues.

This repeated bisecting of concept pattern space efficiently homes in on the exact meaning the user intended and, with minimal effort, provides users with the precise results from the document search.

When the document clustering component 180 is not actively processing user queries, it can also be used to pre-cluster documents stored in the data repository 150 as "known documents." Because the clustering is fully automatic, it negates any need for human categorization of these documents, and thus allows high-speed, efficient, clustering of documents based not only on individual predicates but also on predicate context and overall concept patterns within the documents as a whole.

The search and retrieval system must index documents and serve them to end-users. The five operating modes of the System are:

Exact match (end user mode, online mode)

Document predicate match mode (offline mode)

Bayes training mode (offline mode),

Document indexing mode (offline mode), and

Maintenance mode (offline mode).

The operating modes represent the various ways in which the previously discussed components can interact.

In Bayes training mode, shown in FIG. 7, the object is to train the Bayes classifier 130 to learn membership criteria for a specific topic. This is the mode in which new domain classifications are acquired through the statistical learning techniques discussed previously. In this mode, topic editors provide training data in the form of specific documents known to belong to the selected topic or domain. These documents are used to train the Bayes classifier 130. The classifier is able to determine membership criteria dynamically from the documents in the training set, after which the classifier is considered trained. Once a trained classifier is produced, it can be used by a Bayes classifier 130 to determine whether a document belongs to the domain in which it was trained. This type of classifier is very fast and very accurate in determining domain membership on a very large set of documents. The results of this training process are stored in the data repository 150 for use by the Bayes classifier 130.

In the document-indexing mode a search index is built to store documents as predicates, which can later be used to efficiently match user queries to indexed documents. This mode exercises all of the components provided by the concept-based search and retrieval system 100, and demonstrates all of the benefits of the present invention. However, due to the current state of technology (namely processing power, storage devices and access times, and Internet access speeds) other modes are used to allow users to gain real-time results from their searches.

Documents are indexed by the predicates they contain, which are equivalent to user queries. Thus, two methods are provided for indexing new documents, both of which are realized in the component. The first method involves the retrieval of new documents to answer user queries, which do not already have documents matched to them. The questions are parsed by the query ontological parser 120, which produces a set of predicate structures. These predicates contain a plurality of keywords, which may be brokered to other search facilities to retrieve their indexed documents relating to the user's query.

Alternatively, a spider may be used to retrieve documents automatically from the web, without prior knowledge of their content. These documents are not retrieved via any brokering of user queries, only through standard spidering techniques.

Regardless of the method by which documents are acquired, they are then passed into the Bayes classifier 130, which classifies the documents according to the set of available trained classifiers previously learned in the Bayes classifier 130 Training Mode.

Each of these documents is sent into the document ontological parser 120, which parses it into a predicate library. Each predicate library is compared to the original query predicate structure(s) for relevancy and is assigned a score based on the relevancy. A special scoring algorithm used specifically for the concept based search and retrieval system 100 accomplishes this. The results are then passed to the data repository 150 for later retrieval and/or comparisons with other queries. When no query exists to compare the document against, every predicate within the document is treated as a predicate library to be scored.

The document-indexing mode is fully automated. Once queries are made available to the concept based search and retrieval system 100 or a spider is brought online, the indexing operation requires no further human action to occur. This indexing mode is more efficient than manual methods used by current search directory companies because topic editors do not have to manually categorize web documents.

In this mode, query ontological parser 120 parses the user's query and produces a plurality of predicates, dependent upon the length of the user's query and the number of entities it contains. The query ontological parser 120 does not perform any generalizations of the users query predicate (s) in this mode.

Next a search is performed on the data repository 150 for any stored documents that contain any of the predicates produced by query ontological parser 120. In the event of a match, the documents matching the query are sent to a ranking and formatting component (not discussed) to produce the search results in a user-friendly format, this is then returned to the user.

An exact match occurs when a query posed by the end user produces an exact match, meaning that the predicate structures found in the query are also present in at least one document in the data repository 150.

The document predicate match mode is nearly identical to exact match mode, with only one difference. In this mode the query ontological parser 120 is allowed to create generalized predicates, based on the user's original query. This entails the substitution of synonymous words for all concepts in the user's query. This allows for a broader document search to be performed, as only relationships have to be matched, not specific words. This mode generates multiple queries as a result of a single user query, and thus requires more processing power and time to perform as efficiently as exact match mode. For this reason. The concept based search and retrieval system 100 only switches to document predicate mode when no exact matches are found. However, the concept based search and retrieval system 100 may employ document predicate mode instead of exact match mode as advances in hardware relieve these performance concerns.

Once generalized predicates have been created by the query ontological parser 120, a search for document predicates that match these generalized query predicates is performed. After all matches have been gathered, the links to documents pass through the same ranking and formatting components used in exact match mode.

The maintenance mode becomes active when queries do not result in enough document matches to meet requirements, or when no matches at all are returned. When that happens, the end user may optionally leave an e-mail address with the system. When new documents that match the query are located, the end user is notified via E-mail. This mode permits retraining the Bayes classifier 130 with better documents, or processing more documents with the query ontological parser 120 to produce a better data repository 150.

The following is an example of a sentence and demonstrates both how it is parsed as a sentence within a document (for storage within the data repository 150), and how a question would produce matching predicates to retrieve the document containing this sentence.

The example sentence is:

The octopus has a heart.

First, the sentence lexer 122 would process this sentence. The first component of the sentence lexer 122, the document iterator 210, would extract this sentence from the document it was contained in. At this stage, it would exist as the text string shown above. Following that, it would be passed to the lexer 122, which would access the ontology 128, and return the sequence:

The-det octopus-noun have-verb a-det heart-noun.

Here, "det" stands for determiner, which is a word with a purely grammatical function, namely specifying a noun phrase. The other tags, noun and verb, indicate parts of speech with ontological content. Thus, when the sentence passes through the lexer filters 123, the stop WordFilter removes "a" and "the", leaving:

octopus-noun have-verb heart-noun

Figure 11:
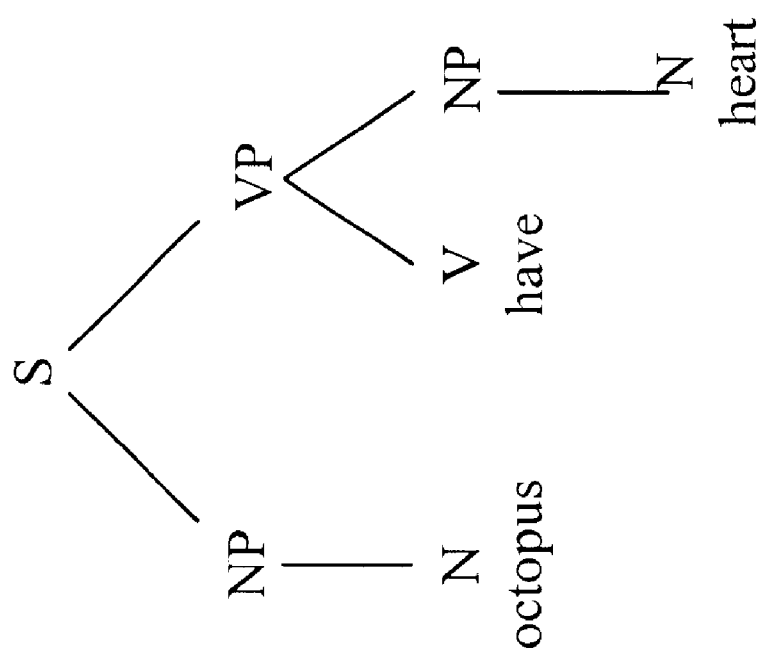
FIG. 11 is a diagram of a parser tree according to one variation of the present invention.

The sentence is then taken up by the sentence receiver 310, which passes it to the parser 124. In the parser 124, the following tree shown in FIG. 11.

A parse tree converter 450 then converts this tree into a predicate, where octopus is the subject of have, and heart is the object. The predicate is:

have<octopus, heart>

This predicate is then passed through the parser filters 125, where it successfully passes the parse probability and selectional feature compatibility tests. After that, it is stored in a predicate library, and passed to the data repository 150.

Suppose that a user asks the question, "Do octopuses have hearts?"

The question will be read by the sentence lexer 122, and a sentence made of ontological entities is produced. It reads:

Do-verb octopus-noun have-verb heart-noun

In the lexer filters 123, the PseudoPredicateFilter removes the first verb, "do", because it is not the main verb of the sentence. "Do" only serves to fill a grammatical role within this type of question, and is thus removed, leaving:

octopus-noun have-verb heart-noun

This is identical to the sentence produced above, and results in the same parse tree, and the same predicate structure. Thus, when the query ontological parser 120 receives this question, it will enable the data repository 150 to find the document containing the sentence originally discussed.

Suppose the system is to use the Bayes classifier 130 to create a Finance-domain-specific classifier that can identify whether or not a given document belongs to Finance domain. The construction of Finance-domain-specific classifier includes two stages: example collection stage and classifier training stage.

Figure 12:
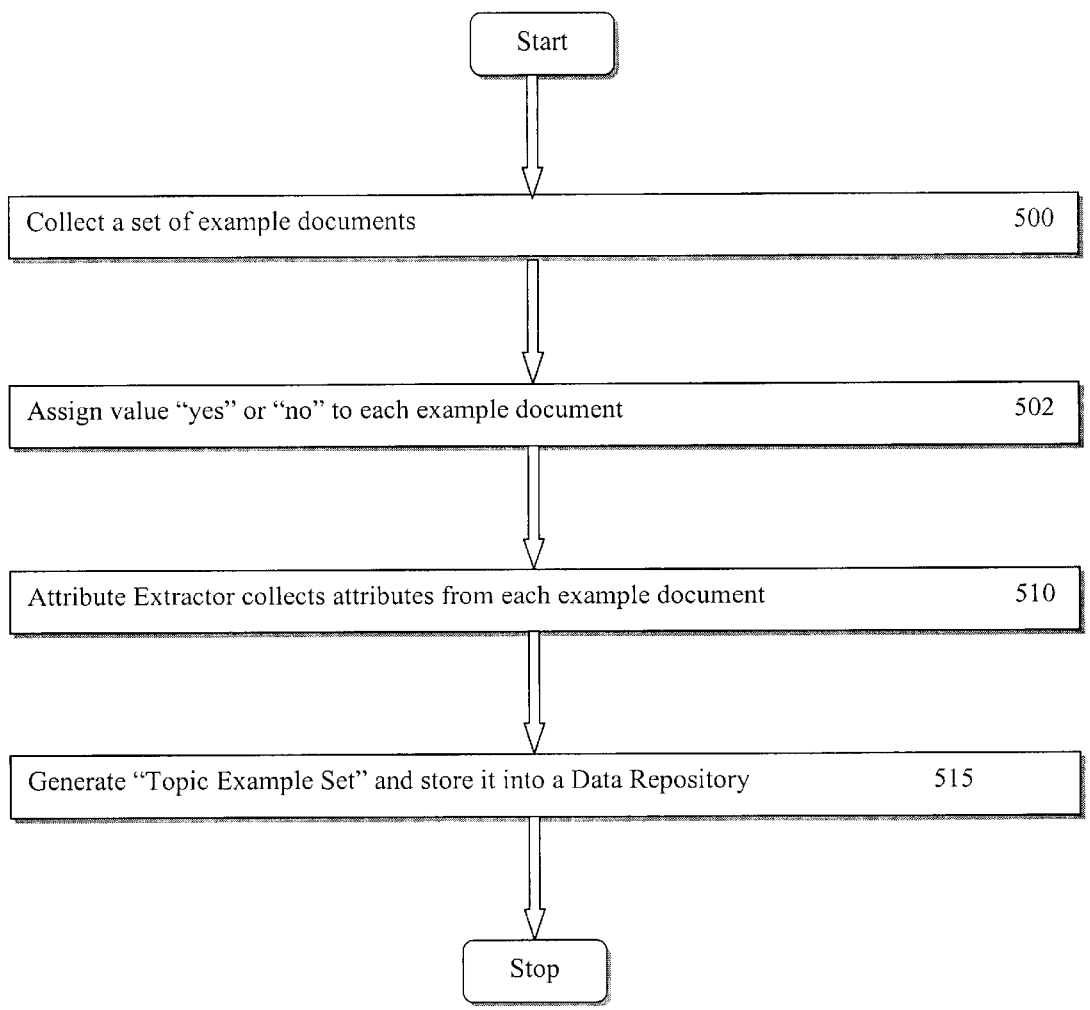
FIG. 12 is a flow chart of an example of classification collection flow according to one variation of the present invention.

FIG. 12 is a flow diagram illustrating the first stage of constructing a Finance-domain-specific classifier.

Topic editors collect a set of example documents contains both documents relevant to and documents irrelevant to Finance domain. This operation is shown in step 500 of FIG. 12. As shown in step 502, topic editor will classify each example document. If an example document belongs to the Finance domain, topic editor assigns value "Yes" to it; if a example document irrelevant to the Finance domain, topic editor will assigns value "No" to it. The attribute collection step 510 includes processes to parse each example document, eliminate the case sensitivity problem; filter stop words and collect all other words in document. All collected words from an example document are treated as a set of attributes representing these example documents. All attributes are in lower case.

A Finance Example set 410 is generated and stored into a data repository is in step 515. A Finance Example set 410 is essentially a set of examples, each of which consists of a set of attributes that represent the document and the value "Yes" or "No" which is assigned by topic editor during step 502

TABLE 2

| Document | Attributes | Value |
|---|---|---|
| 1 | financial, shares, Led, strong, rally, stock, market, Friday, investors, cheered, agreement, Lawmakers, clinton, administration, remove, key, obstacle, legislation, overhaul, financial, services, industry | Yes |
| 2 | canada, 21, sorted, agent, sparking, next, message, biological, mbox, thread, messages, control, thistle, reply, previous | No |

Table 2 is a sample Finance Example Set which contains two documents, one belongs to Finance domain and the other irrelevant with Finance domain. After generating a Finance Example Set, the classifier's construction goes to the next stage, classifier training stage.

Figure 13:
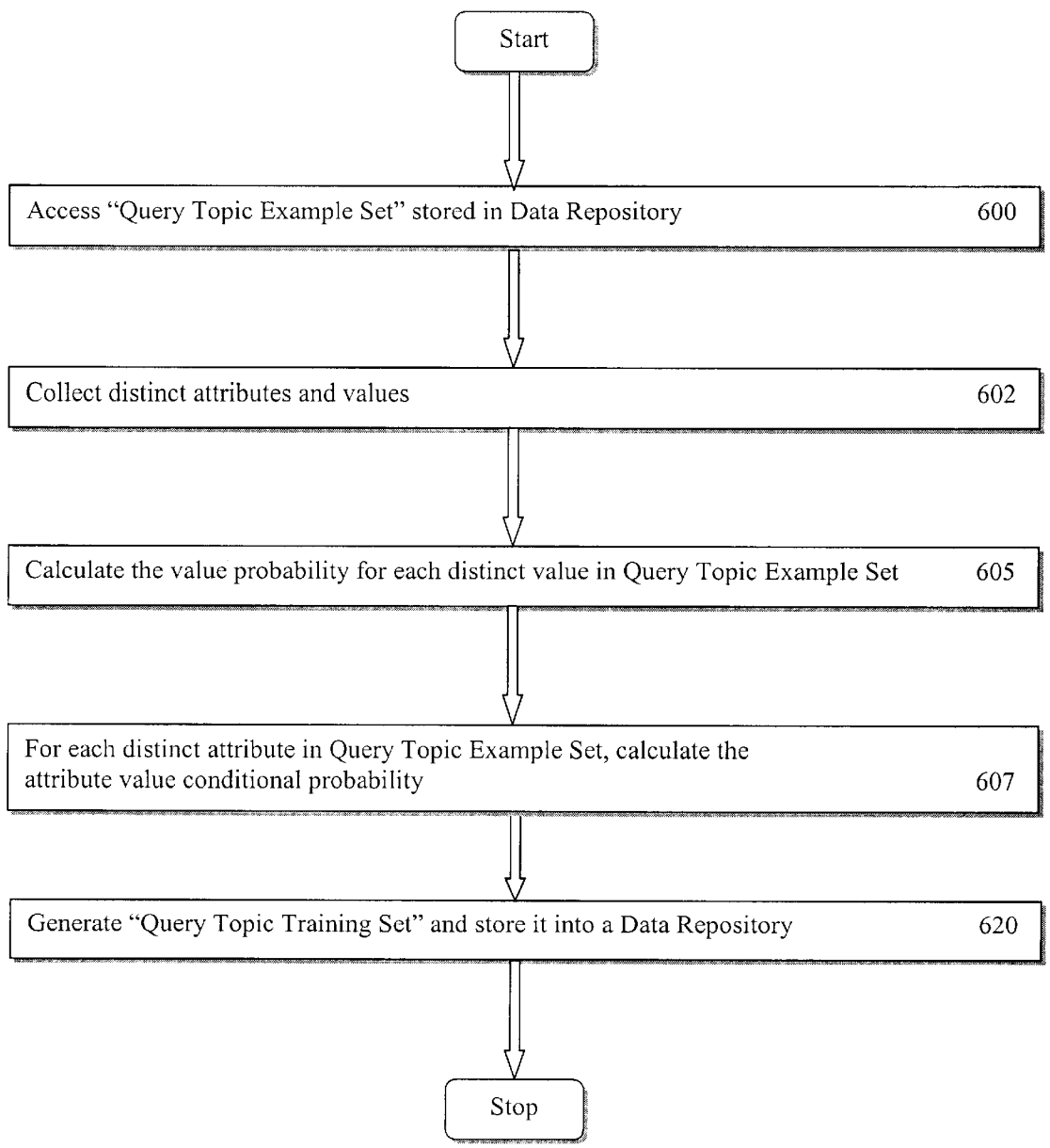
FIG. 13 is flow chart of an example of classification training flow according to one variation of the present invention.

FIG. 13 is a flow diagram shows a Finance-domain-specific classifier's training process. As shown in step 600, Finance Example Set, which contains attributes and values of example documents, are retrieved from data repository.

Step 602 includes a process to collect distinct attributes and values from Finance Example Set. Define set variables A and C; set A←all distinct attributes in Finance Example set 410

C←{Yes, No}—distinct values in Finance Example set 410

Step 605 includes a process to calculate value probability P("Yes") and value probability P("No"). P("Yes") represents the percentage of documents relevant to Finance domain that exist in the Finance Example Set, and P("No") represents the percentage of documents irrelevant to the Finance that exist in the Finance Example Set. In step 607 the conditional attribute probability $P(w_i|\text{"Yes"})$ and $P(w_i|\text{"No"})$ for each attribute $W_1$ are calculated.

As shown in block 620, a Finance Training Set is generated and stored into a data repository 150. An Finance Example set 410 will contains value probabilities P("Yes") and P("No"), a pair of conditional attribute probability $P(w_i|\text{"Yes"})$ and $P(w_i|\text{"No"})$ for each attribute $W_i$ in A.

A populated Finance Training Set represents the knowledge of the Finance-domain-specific classifier.

Based on the probabilities data stored at Training Set, Finance-domain-specific classifier can determine if an input document belongs to Finance domain or not.

The construction of a Finance-domain-specific classifier is now finished. Next, how the Finance-domain-specific classifier is used to classify documents is discussed.

Figure 14:
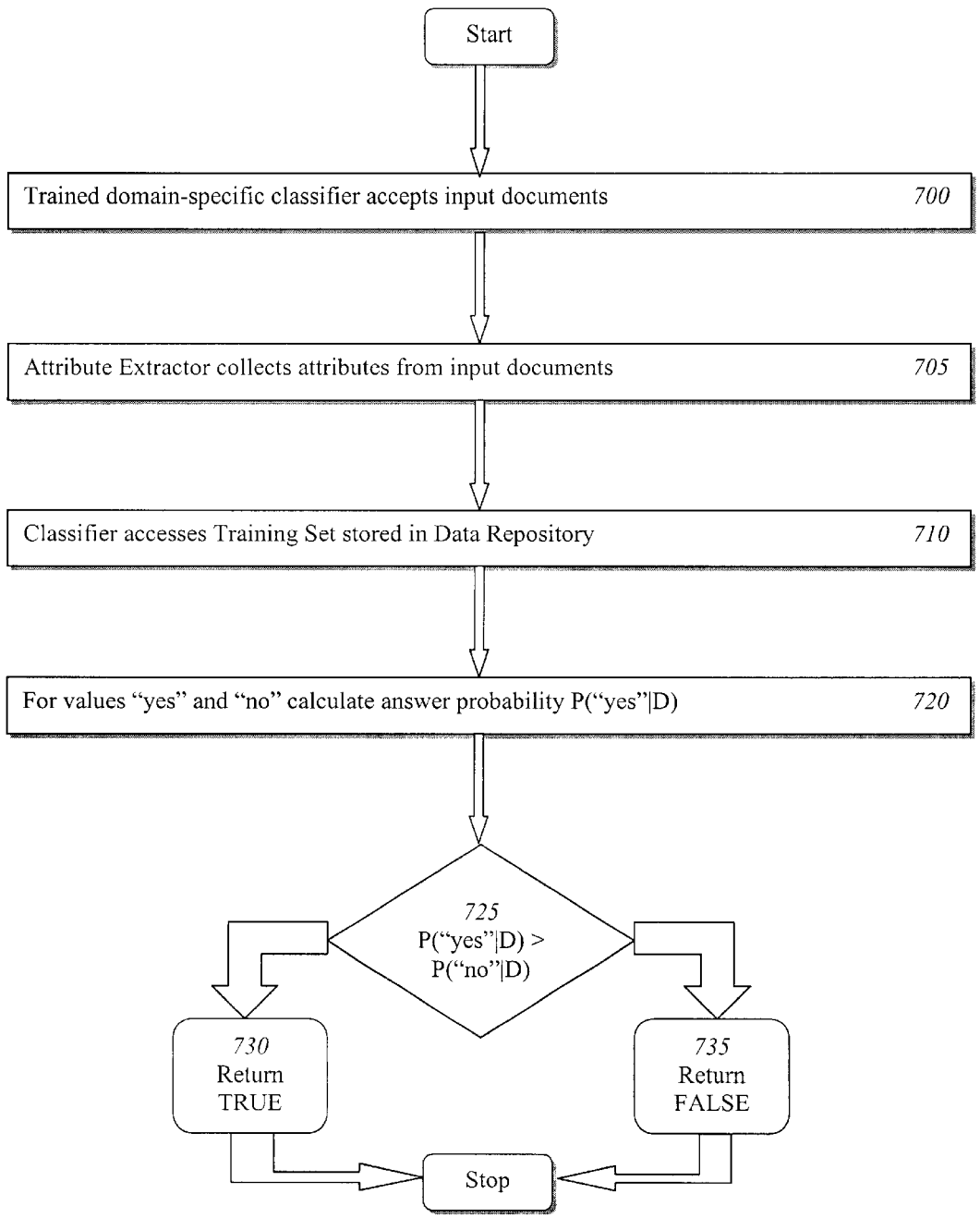
FIG. 14 is a flow chart illustrating an example of the classification process according to one variation of the present invention.

FIG. 14 is a flow diagram illustrating Finance-domain-specific classifier classification process. As shown in the FIG. 14, the concept based search and retrieval system accepts an input document for classification, in step 700. Suppose the input document is a story form the CNN news on Wednesday, Mar. 1, 2000:

Technology stocks soared in heavy trading Wednesday, pushing the Nasdaq composite index to its 13th record of the year as money poured into the economy's hottest chipmakers, telecommunications companies and biotechnology firms.

The attribute extractor 400 collect attributes from this input documents in step 705. Step 705 further includes processes to convert all words into lower case in order to eliminate case sensitivity problem, to filter stop words and collect all other words. Table 3 contains all attributes collected from input document after those processes.

TABLE 3

Technology, stocks, soared, heavy, trading,
wednesday, pushing, nasdaq, composite, index
13th, record, year, money, poured, economy,
hottest, chipmakers, telecommunications,
companies, biotechnology, firms The Finance Training Set, which represent the knowledge of this classifier, is retrieved from the data repository 150 in step 710. In step 720, the process includes the computation of the answer probability P("Yes"|Doc) and P("No"|Doc) according to following equations:

$$P(\text{"Yes"}|D) = P(\text{"Yes"}|w_1, w_2, ..., w_n) = P(\text{"Yes"}) \prod_{i=1}^{n} P(w_i|\text{"YES"})$$

$$P(\text{"No"}|D) = P(\text{"No"}|w_1, w_2, ..., w_n) = P(\text{"No"}) \prod_{i=1}^{n} P(w_i|\text{"No"})$$

In which $w_1, w_2, ..., w_n$ are attributes represent the input document. Here are attributes defined at Table 2. The value probability P(Yes) and P(No), and conditional attribute probability $P(w_i|\text{"Yes"})$ and $P(w_i|\text{"No"})$ can be retrieved from Finance Training Set.

Finally the classifier compares P("Yes"|D) and P("No"|D) in step 725.

If P("Yes"|D)>P("No"|D) then it returns TRUE in step 730 to indicate the input document belongs to Finance domain, otherwise it returns FALSE, in step 735, to indicate the input document is irrelevant to the Finance based search and retrieval system 100 to identify the input query's topic. In general, the system will predefine a set of topics called the Topic Set. Suppose the system has defined a Topic Set containing finance, science, and business as three topics. The system uses the Bayes classifier 130 to construct a query topic specific classifier that can identify whether an input query belongs to one of these topics.

Procedures for constructing a query-topic-specific classifier are the same as procedures for constructing a document domain specific classifier.

Figure 15:
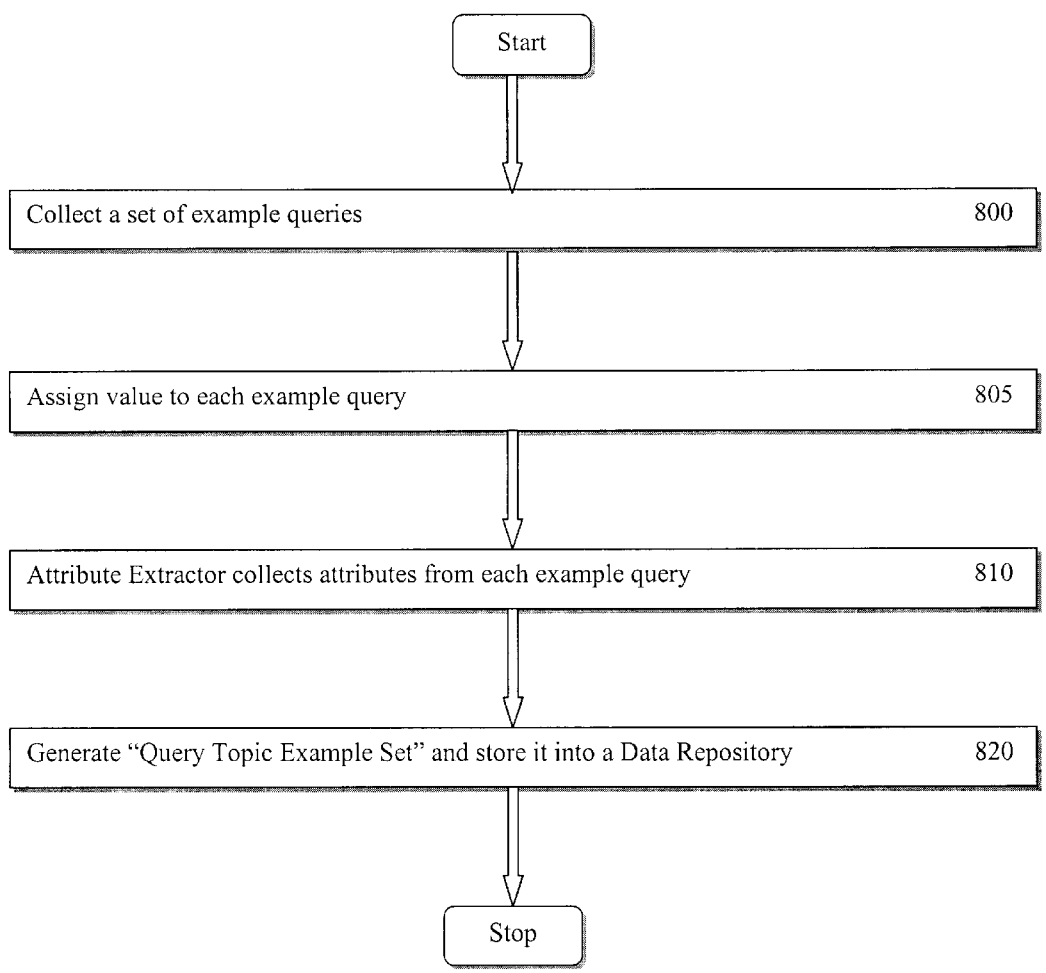
FIG. 15 is a flow chart of query topic example set generation according to one variation of the present invention.

FIG. 15 is a flow diagram showing how to generate Query Topic Example set 410. Topic editors create a set of example queries in step 800, such as:

TABLE 4

"What happened to stock market?"
"Where can I find a list of venture capitalists?"
"Where can I find a concise encyclopedia article on orbits?"
"Where can I learn about the math topic geometry?"
"Where can I find a directory of Web sites for hotels in Nevada?"

The topic editor assigns a value to each query based on his (her) own knowledge in step 805. This also includes a process to extract concepts from the entered user query and expand those concepts by looking up a concept ontology that contains hierarchical concepts in step 810. For example, a query like "What happened to stock market?" can be converted to a predicate structure containing concepts "happened" and "stock market." With a concept ontology 128 that contains hierarchical concepts, "happened" may expand to include "took place" and "occurred," while "stock market" may expand to include "stock exchange," "securities market," and "Nasdaq."

A Query Topic Example set 410 is generated and stored into a data repository 150 for later use in step 820. Table 4 is a sample Query Topic Example set 410 generated for the sample queries listed in Table 5.

TABLE 5

| Query | Attributes | Value |
|---|---|---|
| 1 | "happened", "took place", "occurred", "happen", "take place", "occur", "stock Market", "stock exchange", "securities market", "Nasdaq", "New York Stock Exchange", "stock", | "finance" |
| 2 | "venture capitalists", "speculator", "plunger" | "finance" |
| 3 | "concise", "encyclopedia", "article", "orbits", "brief", "cyclopedia", "reference book' | "science" |
| 4 | "learn", "math", "topic", "geometry", "mathematics" | "science" |
| 5 | "directory", "Web sites", "hotel", "Nevada", "motel", "web page". . . | "business" |

Training processes for the query topic specific classifier are the same as training processes for document-domain-specific classifier described earlier. FIG. 16 is a flow diagram shows how to train a query topic specific classifier. A query topic example set is stored in the data repository 150 in step 850.

Next, distinct attributes and values are collected in step 855. The value probability is calculated for each distinct value in the query topic example set, in step 860. In step 865, for each distinct attribute in the query topic example set, the attribute value conditional probability is calculated. The query topic training set is then generated and stored in the data repository 150 in step 870.

FIG. 17 is a flow diagram showing how a trained query topic specific classifier identifies the topic of an input query. The whole process is very similar to the operation of the document domain specific classifier. The trained query topic-specific classifier accepts an input query in step 900. Next the attribute extractor 400 collects attributes from the input query in step 905. In step 910, the classifier accesses the query topic training set stored in the data repository 150. The answer probability is calculated for each possible answer value, in step 920.

The query topic specific classifier returns a list of topic ranked in order of probability of correctness instead of a single "TRUE" or "FALSE" answer in step 925. For example, for an input query like "What is the current stock price of IBM?" the Query Topic Specific classifier may generate a topic probability table as follows:

| Topic | Probability |
| --- | --- |
| finance | 60% |
| business | 30% |
| science | 10% |

The system can predefine a number n to indicate how many values will be returned. Then the first n topics will be returned as input query's topic(s). For the above example, if the predefined value for n is one, only the first topic, finance, is returned as the input query's topic. If n is two, then the system returns the first two topics, finance and business as the input query's topics.

During document indexing mode each component's function is examined by tracing the path of a complex, but typical, sentence from the Wall Street Journal as it passes through the concept based search and retrieval system 100.

Specifically, the first sentence from the lead story of the Money & Investing section of the Wall Street Journal Interactive Edition on Friday, Oct. 22, 1999 is shown as follows:

"Financial shares led a strong rally in the stock market Friday as investors cheered an agreement by lawmakers and the Clinton administration that removes a key obstacle to legislation that would overhaul the financial-services industry."

The first stage of the search process is for the pages, which potentially match the user's query to be picked up by the search collector, a component of the search and retrieval system whose sole responsibility is the acquisition of documents. At this stage, the example sentence being tracked exists as a few lines of HTML text within a document downloaded by the concept based search and retrieval system 100.

The next stage of the concept-based search and retrieval system is the Bayes classifier 130. The Bayesian classifier 130 takes in the text of the document, and converts it into a set of attributes which are compared against each of the trained classifiers within the Bayes classifier 130. A document may be classified as belonging to multiple categories if the words within the document correspond to attributes of several classifiers. For example, a financial page would be classified as such by the occurrence of words like stock, bond, Federal Reserve, and interest rate. The same page might also be classified as a real estate document if the story was about how interest rate changes would affect mortgages and new home buying.

In this example, a range of available classifiers has not been defined. However, it is still worthwhile to explain why this sentence would be likely to be classified as financial. Each word is independently considered as an attribute of the document. Thus, the facts that the word "financial" appears twice, the word "stock" appears once, the word "shares" appears once, and the word "investors" appears once mean that there are five financial attributes for the document from this sentence alone. When this is compared with the financial training set it is clear that this document contains many matches with the financial category.

After being classified, the sentence then goes to the document ontological parser 140, where it is transformed as discussed previously. Because of the length of the sentence, and the number of rules required to parse it successfully, the parse tree that would be generated from the example sentence is not shown. However, the resulting predicates would include:

lead<financial shares, strong rally>
in<strong rally, stock market>
in<stock market, Friday>
cheer<investors, agreement, lawmakers>
cheer<investors, agreement, Clinton administration>
remove<agreement, key obstacle>
to<key obstacle, legislation>
overhaul<legislation, financial-services industry>

Not all of these words or phrases would be included in the ontology 128, and so the sentence lexer 122 would not be able to place them all in ontological context. However, the linguistic rules encoded in both the lexing and parsing stages still enable The concept based search and retrieval system 100 to recognize noun phrases such as "Clinton administration" and "financial-services industry". These phrases can only be retrieved through exact matches of text, since they are not linked to any synonyms in the ontology 128. However, the predicates they occur within can still be found through the full power of the concept based search and retrieval system 100 retrieval system.

Finally, the document is stored in the data repository 150. Multiple references to the page are generated, each one consisting of a predicate from the list above and a link to the document. The document is scored for its relevance to each of the above predicates, and that information is also maintained, to assist in ranking and formatting during retrieval.

Retrieval is initiated by a user query submitted through the user interface 110. Queries may come from any HTTP-compliant source, generally a web page. The user's query is submitted in the form of a natural-language question. For example, the user might ask:

"What happened in the stock market Friday?"

The query is received by the query ontological parser 120, which converts it into one or more predicates depending on the search mode invoked. In exact match mode, the query is converted into two predicates, happen<?, stock market>and in<stock market, Friday>. These predicates are then used to search the data repository 150. Since the second predicate matches one of the ones listed above, the document is returned to the user.

However, the document is also relevant to questions which do not contain exact matches of any of the predicates above, such as:

"How did investors react to the agreement on financial legislation?"

This would parse into the query predicates react <investors, agreement> and on <agreement, financial legislation>. Neither of these matches the predicates from the sentence shown above, and so exact match mode would not return the document. However, if exact match fails to turn up appropriate results, or if document predicate mode is set as the default, the query ontological parser 120 will generate additional predicates, using both synonyms and higher-level concepts. One of the query predicates generated by the query ontological parser 120 in this mode would be judge<investors, agreement>, as "judge" is a parent concept of "react". Since it is also a parent concept of "cheer", this query would return the document containing the example sentence.

Note that the number of arguments in the predicates do not match; the document parses to cheer<investors, agreement, lawmakers>, which has more arguments than judge<investors, agreement>. The mismatch in the number of arguments would result in a lower score in the ranking and formatting component; however, if not many documents match the query, it will still be prominently displayed as a match for the user's question.

Having described several embodiments of the concept-based indexing and search system in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A method of performing concept-based searching of text documents comprising the steps of:
    transforming said text documents into predicate structures to form predicate libraries of said documents;
    inputting a natural language query;
    creating a query predicate structure representing logical relationships between words in said natural language query, said predicate structure containing a predicate and an argument;
    matching said query predicate structure to said document predicate structures in said predicate libraries; and
    presenting said matched predicate structures from said text documents.

2. A method of performing concept-based searching of text documents as recited in claim 1, wherein said predicate is one of a verb and a preposition.

3. A method of performing concept-based searching of text documents as recited in claim 1, wherein said argument is any part of speech.

4. A method of performing concept-based searching of text documents as recited in claim 1, wherein said argument is a noun.

5. A method of performing a concept-based searching of text documents comprising the steps of:
    transforming a natural language query into predicate structures representing logical relationships between words in said natural language query;
    providing an ontology containing lexical semantic information about words;
    transforming said text documents into predicate structures;
    probabilistically classifying said document predicate structures and said query predicate structures;
    filtering said document predicate structures against said query predicate structures to produce a set of said document predicate structures matching said query predicate structures; and
    ranking said set of matching predicate structures.

6. A method of performing concept-based searching of text documents as recited in claim 5, further comprising the step of storing said ontology, said probabilistic classifications and said predicate structures in a data repository.

7. A method of performing concept-based searching of text documents as recited in claim 5, wherein words and associated probabilities, comprising a statistically-derived category, are used to determine if a particular document belongs to a specific domain.

8. A method of performing concept-based searching of text documents as recited in claim 7, further comprising the step of collecting all attributes occurring in said document and determining if said document belongs to said specified domain.

9. A method of performing concept-based searching of text documents as recited in claim 6, further comprising the steps of:
    determining a topic of said query predicate structure;
    providing a set of trained document examples from said data repository;
    classifying said topic based on said trained set of document examples; and
    providing a list of possible topics ranked in order of probability of correctness.

10. A method of performing concept-based searching of text documents as recited in claim 5, wherein upon failure to match said document predicate structures to said query predicate structures, comparing documents added to said data repository or newly located ones of said documents to said query predicate structure, and notifying a user in the event of a match.

11. A method of performing concept-based searching of text documents as recited in claim 5, wherein upon failure to match said document predicate structures to said query predicate structures, determining whether said query is formulated in terms not previously included in said ontology, and if said determination is positive, designating said query terms as new concepts and adding said query terms to said ontology.

12. A method of performing concept-based searching of text documents as recited in claim 5, further comprising the step of clustering results of said search, said clustering step comprising the following steps of:
    forming a concept pattern vector from said document predicate structures;
    providing a feature map that self-adaptively clusters said concept pattern vectors according to said concept patterns in said documents;
    producing a cluster model representing documents, identified in said concept-based searching, that reflects statistical distribution of said concept pattern vectors representing said documents; and
    providing at least one sample from said cluster model to focus search results.

13. A method of performing concept-based searching of text documents as recited in claim 5, wherein said step of transforming said text documents into predicate structures comprises the steps of:
    removing words that serve as placeholders in English-language;
    removing lexemes representing adjective concepts;
    grouping proper nouns into single lexical nouns;

removing modal verbs; and
removing lexemes containing adverb concepts.

14. A method of performing concept-based searching of text documents as recited in claim 5, wherein said step of transforming a natural language query into predicate structures comprises the steps of:
   removing words that serve as placeholders in English-language;
   removing lexemes representing adjective concepts;
   grouping proper nouns into single lexical nouns;
   removing modal verbs;
   removing lexemes containing adverb concepts; and
   removing modal verbs from said query.

15. A method of performing concept-based searching of text documents as recited in claim 5, wherein said step of transforming said natural language query comprises the steps of:
   transforming said natural language query into multiple sequences of part-of-speech-tagged ontological concepts from said ontology;
   reducing the number of said multiple sequences based on rules relating to sequences of syntactic tags;
   creating syntactic tree structures, based on said syntactic tags, representing grammatical relations between said ontological concepts; and
   reducing the number of said tree structures based on rules relating to improbable syntactic structures, and rules concerning conflicting ontological specifications.

16. A method of performing concept-based searching of text documents as recited in claim 15, further comprising the step of converting said tree structures into predicate structures.

17. A method of performing concept-based searching of text documents as recited in claim 5, wherein said step of transforming said text documents comprises the steps of
   transforming said documents into multiple sequences of part-of-speech-tagged ontological concepts from said ontology;
   reducing the number of said multiple sequences based on rules relating to sequences of syntactic tags;
   creating syntactic tree structures representing grammatical relations between said ontological concepts based on said syntactic tags; and
   reducing the number of said tree structures based on rules relating to improbable syntactic structures, and rules concerning conflicting ontological specifications.

18. A method of performing concept-based searching of text documents as recited as recited in claim 17, further comprising the step of converting said tree structures into predicate structures.

19. A method of performing concept-based searching of text documents as recited in claim 12, further comprising the step of using said ontology to develop said feature map to cluster said concept patterns.

20. An apparatus for use in an information retrieval system for retrieving information in response to a query, comprising:
   a query ontological parser that transforms a natural language query into predicate structures;
   an ontology providing information about words, said information comprising lexical semantic representation and syntactic types;
   a document ontological parser that transforms documents into predicate structures;
   a Bayes classifier probabilistically classifying said documents and said query;
   adaptive filters for filtering said documents against said query to produce a set of said documents matching said query; and
   a ranking module for ranking said set of matching documents.

21. An apparatus for use in an information retrieval system for retrieving information in response to a query as recited in claim 20, further comprising a data repository storing said ontology, results from said Bayes classifier, and said predicate structures from said document ontological structure.

22. An apparatus for use in an information retrieval system for retrieving information in response to a query as recited in claim 20, wherein said query ontological parser comprises:
   a sentence lexer that transforms said natural language query into multiple sequences of part-of-speech-tagged ontological concepts from said ontology;
   post-lexer filters that reduce the number of said multiple sequences produced by said sentence lexer, based on rules relating to sequences of syntactic tags;
   a parser that creates syntactic tree structures representing grammatical relations between said ontological concepts based on said syntactic tags; and
   post-parser filters that reduce the number of said parse trees based on rules relating to improbable syntactic structures, and rules concerning conflicting ontological specifications.

23. An apparatus for use in an information retrieval system for retrieving information in response to a query as recited in claim 21, wherein said Bayes classifier comprises a learner that produces a set of trained document examples from data obtained from said data repository.

24. An apparatus for use in an information retrieval system for retrieving information in response to a query as recited in claim 21, wherein said Bayes classifier comprises a reasoner that determines a probability that a classified document matches said query.

25. An apparatus for use in an information retrieval system for retrieving information in response to a query as recited in claim 20, wherein said Bayes classifier comprises a reasoner that determines a probability that a classified document matches said query.

26. An apparatus for use in an information retrieval system for retrieving information in response to a query as recited in claim 24, wherein said Bayes classifier is document-domain-specific so that words representative of a concept are used to determine if a particular document belongs to a specific domain, and said reasoner determines a probability that a pre-classified document belongs to said specific domain that said Bayes classifier is trained to classify.

27. An apparatus for use in an information retrieval system for retrieving information in response to a query as recited in claim 26, further comprising an attribute extractor that collects all attributes occurring in said documents and sends said attributes to said reasoner to determine if said documents belong to said specified domain.

28. An apparatus for use in an information retrieval system for retrieving information in response to a query as recited in claim 24, wherein said Bayes classifier is query-topic specific so that words that form said query are used to determine a topic of said query.

29. An apparatus for use in an information retrieval system for retrieving information in response to a query as recited in claim 28, wherein said Bayes classifier further comprises a learner that produces a set of trained document examples from data obtained from said data repository.

30. An apparatus for use in an information retrieval system for retrieving information in response to a query as recited in claim 29, wherein said reasoner classifies said topic based on said trained set of document examples and provides a list of possible topics ranked in order of probability of correctness.

31. An apparatus for use in an information retrieval system for retrieving information in response to a query as recited in claim 20, wherein said document ontological parser comprises:
- a sentence lexer that transforms said documents into multiple sequences of part-of-speech-tagged ontological concepts from said ontology;
- post-lexer filters that reduce the number of said multiple sequences produced by said sentence lexer, based on rules relating to sequences of syntactic tags;
- a parser that creates syntactic tree structures representing grammatical relations between said ontological concepts based on said syntactic tags; and
- post-parser filters that reduce the number of said parse trees based on rules relating to improbable syntactic structures, and rules concerning conflicting ontological specifications.

32. An apparatus for use in an information retrieval system for retrieving information in response to a query as recited in claim 20, further comprising a persistent agent maintaining at least one of said predicate structures extracted from said query,
- wherein, upon failure to match said documents to said query, documents added to said data repository or newly located ones of said documents parsed by said document ontological parser are compared to said at least one predicate structure extracted from said query, and a notification is sent to a user upon a match.

33. An apparatus for use in an information retrieval system for retrieving information in response to a query as recited in claim 20, further comprising a persistent agent maintaining at least one of said predicate structures extracted from said query,
- wherein, upon failure to match said documents to said query, a determination is made whether said query is formulated in terms not previously included in said ontology, and if said determination is positive, said query terms are designated as new concepts and added to said ontology.

34. An apparatus for use in an information retrieval system for retrieving information in response to a query as recited in claim 20, wherein said ranking module determines similarity between said query and each of said documents returned from said data repository.

35. An apparatus for use in an information retrieval system for retrieving information in response to a query as recited in claim 20, wherein said ranking module determines similarity between said predicate structure of said query and each predicate structure of said documents returned from said data repository.

36. An apparatus for use in an information retrieval system for retrieving information in response to a query comprising:
- a query ontological parser that transforms a natural language query into predicate structures;
- an ontology providing information about words, said information comprising syntactic uses and definitions;
- a document ontological parser that transforms documents into predicate structures;
- a Bayes classifier probabilistically classifying said documents and said query;
- adaptive filters for filtering said predicate structures of said documents against said predicate structures of said query to group said documents according to similarity of concept patterns contained in said documents relative to said query or additional feedback; and
- a ranking module for ranking said set of matching predicate structures.

37. An apparatus for use in an information retrieval system for retrieving information in response to a query as recited in claim 20, wherein said predicate structures for each of said documents forms at least one concept pattern vector for each of said documents.

38. An apparatus for use in an information retrieval system for retrieving information in response to a query as recited in claim 36, wherein said predicate structures for each of said documents forms at least one concept pattern vector for each of said documents.

39. An apparatus for use in an information retrieval system for retrieving information in response to a query as recited in claim 20, wherein said query predicate structure and said document predicate structures comprise a predicate and an argument, said predicate is one of a verb and a preposition, and said argument is any part of speech.

40. An apparatus for use in an information retrieval system for retrieving information in response to a query as recited in claim 36, wherein said query predicate structure and said document predicate structures comprise a predicate and an argument, said predicate is one of a verb and a preposition, and said argument is any part of speech.

41. An apparatus for use in an information retrieval system for retrieving information in response to a query as recited in claim 20, wherein said adaptive filters comprise a feature map that clusters said matching documents according to concept patterns in said query and produces a cluster model representing a statistical probability distribution of said matching documents.

42. An apparatus for use in an information retrieval system for retrieving information in response to a query as recited in claim 22, wherein said post-lexer filters comprise:
- a stop word filter that removes words that serve as placeholders in English-language;
- an adjective filter that removes lexemes representing adjective concepts;
- a proper noun filter that groups proper nouns into single lexical nouns;
- a modal verb filter that removes modal verbs;
- an adverb filter that removes lexemes containing adverb concepts; and
- a pseudo-predicate filter that removes verbs from said queries.

43. An apparatus for use in an information retrieval system for retrieving information in response to a query as recited in claim 31, wherein said post-lexer filters comprise:
- a stop word filter that removes words that serve as placeholders in English-language;
- an adjective filter that removes lexemes representing adjective concepts;
- a proper noun filter that groups proper nouns into single lexical nouns;
- a modal verb filter that removes modal verbs; and
- an adverb filter that removes lexemes containing adverb concepts.

44. An apparatus for use in an information retrieval system for retrieving information in response to a query as recited in claim 22, wherein said parser comprises a parse tree converter for converting parse trees into predicate structures.

45. An apparatus for use in an information retrieval system for retrieving information in response to a query as recited in claim 31, wherein said parser comprises a parse tree converter for converting parse trees into predicate structures.

* * * * *

UNITED STATES PATENT AND TRADEMARK OFFICE
CERTIFICATE OF CORRECTION

PATENT NO.    : 6,675,159 B1
DATED         : January 6, 2004
INVENTOR(S)   : Albert Deirchow Lin et al.

It is certified that error appears in the above-identified patent and that said Letters Patent is hereby corrected as shown below:

<u>Title page,</u>
Insert Item:
-- [73] Assignee: Science Applications International Corporation --;
Item [56], References Cited, U.S. PATENT DOCUMENTS, please insert:

| | | | |
|---|---|---|---|
| US | 5,870,701 | 2/9/1999 | Wachtel |
| US | 5,930,746 | 7/27/1999 | Ting |
| US | 5,297,039 | 3/22/1994 | Kanaegami et al. |
| US | 5,321,833 | 6/14/1994 | Chang et al. |
| US | 5,535,382 | 7/9/1996 | Ogawa |
| US | 5,706,497 | 1/6/1998 | Takashi et al. |
| US | 5,802,515 | 9/1/1998 | Adar et al. |
| US | 5,870,740 | 2/9/1999 | Rose et al. |
| US | 5,576,954 | 11/19/1996 | Driscoll |
| US | 5,694,592 | 12/2/1997 | Driscoll |
| US | 5,893,092 | 4/6/1999 | Driscoll |
| US | 5,920,854 | 7/6/1999 | Kirsch et al. |
| US | 6,012,053 | 1/4/2000 | Pant et al. |
| US | 5,317,507 | 5/31/1994 | Gallant |
| US | 5,619,709 | 4/8/1997 | Caid et al. |
| US | 5,974,412 | 10/26/1999 | Hazlehurst et al. |
| US | 5,835,087 | 11/10/1998 | Herz et al. |
| US | 5,864,855 | 1/26/1999 | Ruocco et al. |
| US | 6,047,277 | 4/4/2000 | Parry et al. |
| US | 5,446,891 | 8/29/1995 | Kaplan et al. |
| US | 5,675,710 | 10/7/1997 | Lewis |
| US | 5,680,627 | 10/21/1997 | Anglea et al. |

Signed and Sealed this

Twenty-fifth Day of May, 2004

JON W. DUDAS
*Acting Director of the United States Patent and Trademark Office*